(12) United States Patent
Nada

(10) Patent No.: US 9,371,795 B2
(45) Date of Patent: Jun. 21, 2016

(54) COMBUSTION CONTROL APPARATUS OF INTERNAL COMBUSTION ENGINE

(75) Inventor: Mitsuhiro Nada, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 764 days.

(21) Appl. No.: 13/389,559

(22) PCT Filed: Oct. 21, 2009

(86) PCT No.: PCT/JP2009/068131
§ 371 (c)(1),
(2), (4) Date: Feb. 8, 2012

(87) PCT Pub. No.: WO2011/048676
PCT Pub. Date: Apr. 28, 2011

(65) Prior Publication Data
US 2012/0143479 A1  Jun. 7, 2012

(51) Int. Cl.
*F02D 41/30* (2006.01)
*F02D 41/40* (2006.01)
(Continued)

(52) U.S. Cl.
CPC .......... *F02D 41/3029* (2013.01); *F02D 41/005* (2013.01); *F02D 41/3035* (2013.01); *F02D 41/402* (2013.01); *F02D 35/025* (2013.01); *F02D 41/1446* (2013.01);
(Continued)

(58) Field of Classification Search
CPC . F02D 35/025; F02D 41/005; F02D 41/3029; F02D 41/3035; F02D 41/3809; F02D 41/402; Y02T 10/44; Y02T 10/47
USPC ............ 123/299, 300, 305, 478, 480, 568.12, 123/568.13, 568.21; 701/104, 105, 108; 60/602, 606.2; 8/299, 300, 305, 478, 8/480, 568.12, 568.13, 568.21
See application file for complete search history.

(56) References Cited

U.S. PATENT DOCUMENTS 6,276,334 B1 * 8/2001 Flynn et al. .................... 123/435
6,644,018 B2 * 11/2003 Taga .................. F02M 63/0225
60/278

(Continued)

FOREIGN PATENT DOCUMENTS

JP  2001-193526 A  7/2001
JP  2001-227393 A  8/2001
(Continued)

OTHER PUBLICATIONS

International Search Report of PCT/JP2009/068131 mailed Nov. 17, 2009.

*Primary Examiner* — Erick Solis
*Assistant Examiner* — Carl Staubach
(74) *Attorney, Agent, or Firm* — Kenyon & Kenyon LLP

(57) ABSTRACT

During high-load operation of an engine, fuel for initial slow-burning combustion and premixed combustion is injected into a combustion chamber by continuous fuel injection, then fuel injection is paused, and fuel for diffusion combustion is injected after a predetermined interval has elapsed. Also, the fuel injection amount in the continuous fuel injection is set higher than the fuel injection amount for diffusion combustion. A spray autointerference cooling effect is achieved by the continuous fuel injection, thus promoting ignition delay so as to increase the proportion of premixed combustion, thereby suppressing the production of smoke. This enables high-volume EGR to be performed, thus enabling reducing the amount of NOx produced.

7 Claims, 10 Drawing Sheets

(51) Int. Cl.
*F02D 41/00* (2006.01)
*F02D 41/14* (2006.01)
*F02D 41/38* (2006.01)
*F02D 35/02* (2006.01)

(52) U.S. Cl.
CPC ............ *F02D 41/3809* (2013.01); *Y02T 10/44* (2013.01); *Y02T 10/47* (2013.01)

(56) References Cited

U.S. PATENT DOCUMENTS

| | | | | |
|---|---|---|---|---|
| 6,725,829 | B2* | 4/2004 | Kataoka | F02B 47/08 123/299 |
| 6,907,870 | B2* | 6/2005 | zur Loye et al. | 123/594 |
| 6,935,304 | B1* | 8/2005 | Liu | 123/299 |
| 6,994,077 | B2* | 2/2006 | Kobayashi et al. | 123/568.11 |
| 7,497,199 | B2* | 3/2009 | Canale | F02D 35/023 123/299 |
| 7,681,550 | B2* | 3/2010 | Kobayashi | 123/299 |
| 8,010,277 | B2* | 8/2011 | Ishizuka et al. | 701/114 |
| 8,616,163 | B2* | 12/2013 | Huebner | F02D 41/3035 123/48 AA |
| 2003/0033800 | A1* | 2/2003 | Tonetti et al. | 60/286 |
| 2004/0154582 | A1* | 8/2004 | Shimazaki | 123/299 |
| 2006/0201143 | A1* | 9/2006 | Jacobsson et al. | 60/295 |
| 2007/0089704 | A1 | 4/2007 | Jacobsson et al. | |
| 2007/0209633 | A1 | 9/2007 | Brachert et al. | |
| 2008/0103675 | A1* | 5/2008 | Ishizuka | F02D 41/123 701/103 |
| 2009/0254261 | A1* | 10/2009 | Inoue | F02D 41/1498 701/103 |
| 2011/0320108 | A1* | 12/2011 | Morinaga et al. | 701/105 |
| 2012/0016571 | A1* | 1/2012 | Nada | 701/104 |
| 2013/0332051 | A1* | 12/2013 | Wolk et al. | 701/104 |

FOREIGN PATENT DOCUMENTS

| | | |
|---|---|---|
| JP | 2002-188487 A | 7/2002 |
| JP | 2004-003415 A | 1/2004 |
| JP | 2006-194190 A | 7/2006 |
| WO | 02/066813 A1 | 8/2002 |

* cited by examiner

COMBUSTION CONTROL APPARATUS OF INTERNAL COMBUSTION ENGINE

This is a 371 national phase application of PCT/JP2009/068131 filed 21 Oct. 2009, the content of which is incorporated herein by reference.

FIELD OF THE INVENTION

The present invention relates to a combustion control apparatus of a compression self-ignition internal combustion engine represented by a diesel engine. In particular, the present invention relates to a countermeasure for improving exhaust emissions.

BACKGROUND OF THE INVENTION

In engines that perform lean combustion, such as diesel engines, an operation range in which an air-fuel mixture having a high air-fuel ratio (lean atmosphere) is caused to combust accounts for most of the entire operation range, thus causing concern regarding the emission of a relatively large amount of nitrogen oxides (hereinafter referred to as NOx). As a countermeasure, it is known to provide an EGR (Exhaust Gas Recirculation) apparatus that recirculates part of the exhaust gas into the intake path (e.g., see PTL 1 and PTL 2). Specifically, the in-cylinder oxygen concentration and oxygen density are lowered by recirculating exhaust gas into the cylinders. This lowers the combustion temperature (flame temperature) during combustion in the combustion chamber, thereby suppressing the production of NOx and improving exhaust emissions.

On the other hand, if the air-fuel mixture undergoes incomplete combustion during combustion in the combustion chamber, smoke is produced in the exhaust gas, thus leading to worsening of exhaust emissions. As a countermeasure for reducing the amount of smoke that is produced, it has been proposed in PTL 3 described below, for example, to execute auxiliary combustion in the compression stroke of the engine, and thereafter execute main injection so as to achieve a diffusion combustion state. In other words, causing the combustion in the auxiliary injection to be premixed combustion overcomes oxygen deficiency in the combustion field, thus suppressing the production of smoke.

CITATION LIST

Patent Literature

PTL 1: JP 2004-3415A
PTL 2: JP 2002-188487A
PTL 3: JP 2001-193526A

SUMMARY OF INVENTION

Technical Problem

Incidentally, in the case of reducing the diameter of the injection hole in order to atomize the fuel sprayed from an injector for the purpose of improving combustion characteristics, the fuel injection amount per unit of time decreases. For this reason, the total fuel injection period increases in length during high-load operation of an engine in which the total fuel injection amount is set high. Note that there is no limitation to an injector whose injection hole diameter has been reduced, and even in an engine in which injectors having a normal injection hole diameter are installed, the total fuel injection period increases in length in a situation in which the total fuel injection amount is set high, such as during high-load operation.

In conventional technology, as with the technical idea disclosed in PTL 3, it has been conceived that the production of smoke is suppressed by dividing main injection into many stages so as to reduce the fuel injection amount for each fuel injection.

However, in an engine operation state that requires a long total fuel injection period as described above (e.g., during high-load operation of the above-described engine in which injectors having a very small injection hole diameter are installed), dividing main injection into many stages results in the combustion of fuel in each injection period of each divided injection, and therefore the temperature inside the combustion chamber rises rapidly. As a result, it is possible for a large-scale diffusion combustion state to be reached in a mid-way stage among the many divided injections, and for a large amount of smoke to be produced due to oxygen deficiency in the combustion field.

FIG. 11 shows change in the heat generation rate in a cylinder and a fuel injection pattern in a main injection execution period in which three divided injections are performed. Also, among the heat generation rate waveforms shown in FIG. 11, the broken line is a heat generation rate waveform according to which the production of smoke can be sufficiently suppressed. In other words, sufficiently suppressing the production of smoke requires adjusting the heat generation rate during actual combustion so as to not exceed the heat generation rate waveform rate indicated by the broken line. On the other hand, the solid line in FIG. 11 is an example of an actual heat generation rate waveform in the case where the three divided injections are performed during high-load operation of the engine (operation that requires a long total fuel injection period).

As can be understood from FIG. 11, when divided injections are executed during high-load operation, combustion progresses in the combustion chamber in the intervals between the respective fuel injections, and therefore the heat generation rate rises rapidly after the start of the second fuel injection, and the temperature in the combustion chamber also rises rapidly. In FIG. 11, the heat generation rate immediately after the start of the second fuel injection exceeds the heat generation rate waveform indicated by the broken line (the heat generation rate waveform according to which the production of smoke can be sufficiently suppressed). In other words, the scale of the combustion expands due to premature ignition. Then, in the subsequent third fuel injection, a relatively large amount of fuel undergoes diffusion combustion, thus producing a large amount of smoke due to oxygen deficiency in the combustion field.

On the other hand, although it is effective to recirculate part of the exhaust gas into the intake path in order to suppress the amount of NOx produced as described above, in the case where the exhaust gas recirculation amount is increased such that almost no NOx is produced (e.g., the EGR rate is set to 20% or higher), the in-cylinder temperature rises due to the heat of the recirculated exhaust gas. Specifically, there is a limit to how low the temperature of this exhaust gas recirculated into the intake path (hereinafter, sometimes referred to as "EGR gas") can be reduced even when cooling is performed by an EGR cooler, and the in-cylinder temperature rises significantly in a situation in which the amount of such high-temperature EGR gas increases in the intake system.

In such a situation where the amount of recirculated EGR gas has increased, similarly to the above-described case of divided injection, it is possible for the combustion state of fuel injected from the injectors to reach a large-scale diffusion combustion state, and for a large amount of smoke to be produced due to oxygen deficiency in the combustion field.

In consideration of the above points, the inventors of the present invention focused on the fact that if the amount of premixed combustion in the combustion chamber is increased (if the amount of fuel that undergoes premixed combustion is increased) in the state where the amount of NOx produced is suppressed by an increase in the exhaust gas recirculation amount, both the suppression of the amount of NOx produced and the suppression of the amount of smoke produced can be achieved.

The present invention has been achieved in light of such points, and an object thereof is to provide a combustion control apparatus of an internal combustion engine that can achieve both the suppression of the amount of NOx produced and the suppression of the amount of smoke produced.

Solution to Problem

—Principles of Solution—

A principle of solution of the present invention that has been devised in order to achieve the above object is that main fuel injection is executed in a continuous manner from before compression top dead center of a piston to after compression top dead center, thus promoting a cooling effect in fuel spray injected in that period (continuous main injection period) and increasing the proportion of premixed combustion by promoting ignition delay.

—Solving Means—

Specifically, the present invention is premised on a combustion control apparatus of a compression self-ignition internal combustion engine including an exhaust gas recirculation apparatus by which part of exhaust gas discharged to an exhaust system is recirculated into an intake system, and a fuel injection valve configured such that multi-stage divided main injections can be executed as main injection that is fuel injection for obtaining required torque that is determined according to the internal combustion engine operation state. In this combustion control apparatus of an internal combustion engine, at a time of low-load operation of the internal combustion engine, fuel injections respectively corresponding to initial slow-burning combustion, premixed combustion, and diffusion combustion are executed in order as mutually independent multi-stage divided main injections, and at a time of high-load operation of the internal combustion engine, in a state in which part of exhaust gas is recirculated into the intake system by the exhaust gas recirculation apparatus, continuous main injection that is continuous for a period from before compression top dead center of a piston to after compression top dead center is executed, premixed combustion is performed by achieving a spray cooling effect in a combustion chamber through an endothermic reaction of fuel injected by the continuous main injection, diffusion combustion main injection for performing diffusion combustion is executed after the continuous main injection has ended, and a fuel injection amount in the continuous main injection is set higher than a fuel injection amount in the diffusion combustion main injection.

According to this specified matter, in the majority of the injection period of the continuous main injection, fuel that is injected in the combustion chamber is cooled by an endothermic reaction with fuel that is subsequently injected in the combustion chamber. This cooling effect of subsequently injected fuel (hereinafter, also referred to as the autointerference cooling effect) is performed in a continuous manner, thus suppressing a rise in the combustion field temperature (temperature in the region where the fuel spray is present) in the combustion chamber. For this reason, the majority of the combustion form of fuel injected in this injection period is premixed combustion, and oxygen is not insufficient in the combustion field, thus enabling suppressing the production of smoke. Also, since the production of smoke can be suppressed by this autointerference cooling effect, the EGR rate of the exhaust gas recirculation apparatus can be set even higher (set to high-volume EGR, with an EGR rate of 20% or higher, for example). In other words, a state in which smoke is not produced even if the EGR rate is set high can be obtained, and the amount of NOx that is produced can also be significantly reduced along with this high-volume EGR.

On the other hand, after continuous main injection that is continuous for a period from before compression top dead center of a piston to after compression top dead center has been executed, diffusion combustion main injection for performing diffusion combustion is executed. Specifically, the combustion form of this fuel is diffusion combustion in which combustion starts immediately after injection. In this diffusion combustion as well, as described above, an excessive rise in the temperature in the combustion chamber is suppressed by the autointerference cooling effect in the continuous main injection, and therefore it is possible to both suppress the amount of NOx produced and suppress the amount of smoke produced in diffusion combustion as well.

Also, by providing a fuel injection stop period between the continuous main injection for performing premixed combustion and the diffusion combustion main injection for performing diffusion combustion, it is possible to suppress the peak value of the heat generation rate in the combustion period to a low value, and to suppress combustion noise.

Also, performing the multi-stage divided injections during low-load operation of the internal combustion engine suppresses the peak value of the heat generation rate to a low value and suppresses combustion noise.

Furthermore, executing fuel injection (continuous main injection) in a continuous manner for a period from before compression top dead center of the piston to after compression top dead center enables effectively exhibiting the autointerference cooling effect, and also prevents an increase in the amount of HC produced, which is a concern if the injection period is set earlier, and prevents insufficient torque in the internal combustion engine, which is a concern if the injection period is delayed.

Also, by setting the fuel injection amount in the continuous main injection and the diffusion combustion main injection so as to achieve different penetration forces, the combustion field in diffusion combustion is a different region from that of the combustion field in premixed combustion. This enables avoiding an oxygen deficiency in the combustion field of diffusion combustion, and enables more reliably suppressing the production of smoke in diffusion combustion.

It is preferable to perform the following operation as an auxiliary operation for suppressing the production of smoke and NOx. Specifically, an encounter rate reduction operation for reducing an encounter rate between oxygen and fuel spray in a cylinder is performed while the continuous main injection is executed.

Here, "encounter rate between oxygen and fuel spray in a cylinder" refers to the probability (frequency) of so-called "meeting" (undergoing chemical reaction) between oxygen molecules and fuel particles in the cylinder, and the higher the encounter rate, the more a chemical reaction progresses in the cylinder, and the higher the in-cylinder temperature rises along with an increase in the heat generation rate. Specifically, if an operation for reducing the encounter rate is performed as described above, even if the amount of oxygen molecules is low or if the amount of fuel particles is high in a partial region in the cylinder (e.g., a small region in the central portion of the combustion chamber), the degree of progression of the chemical reaction is low, and combustion can be performed gradually at a low temperature (e.g., approximately 800 K) in the cylinder. Premixed combustion can be realized by, for example, suppressing the number of collisions between oxygen molecules and fuel particles per unit of volume in the cylinder, or suppressing the momentum of the oxygen molecules.

Since premixed combustion is performed in the state of a reduced encounter rate between oxygen and fuel spray in the cylinder in this way, the heat generation rate, which is the amount of heat generated per unit of time, is relatively low, and this also enables suppressing the production of smoke and NOx.

Preferably, at least any one of an exhaust gas recirculation operation performed by the exhaust gas recirculation apparatus, an intake throttle valve operation in the intake system, and an operation for reducing the in-cylinder temperature is executed as the encounter rate reduction operation.

Reducing the oxygen concentration in the intake an reducing the amount of intake air, or reducing the kinetic energy of oxygen molecules and fuel spray in the cylinder through these operations enables effectively reducing the encounter rate and easily realizing premixed combustion.

Also, it is preferable that fuel injection control is executed such that a time at which a heat generation rate changes from rising to falling in a combustion period spanning from the premixed combustion through the diffusion combustion is present at only one place on the angle of delay side of compression top dead center of a piston. Specifically, this realizes fuel injection control that enables obtaining stable torque by causing the various combustion forms to be continuous.

Also, an exhaust gas recirculation rate in a state in which part of exhaust gas is recirculated into the intake system by the exhaust gas recirculation apparatus is set to 20% or more, or preferably 30% or more. Setting a relatively high exhaust gas recirculation rate in this way enables significantly reducing the amount of NOx produced.

Furthermore, it is preferable that the injection hole diameter of the fuel injection valve has been reduced such that a fuel injection rate at a time of valve opening is less than or equal to a predetermined injection rate. Reducing the injection hole diameter in this way atomizes the fuel spray, thus improving combustibility and suppressing the HC production amount, for example. Note that it is possible for this to lead to a lengthening of the fuel injection period. In this case, performing fuel injection control so as to obtain the autointerference cooling effect as described above promotes ignition delay, thus enabling increasing the proportion of premixed combustion, and enabling achieving both the suppression of the amount of NOx produced and the suppression of the amount of smoke produced.

Advantageous Effects of Invention

According to the present invention, executing fuel injection in a continuous manner for a period from before compression top dead center of a piston to after compression top dead center promotes a cooling effect in the fuel spray injected in that period, and the proportion of premixed combustion is increased due to promoting ignition delay. This enables achieving both the suppression of the amount of NOx produced and the suppression of the amount of smoke produced, and enables improving exhaust emissions.

DETAILED DESCRIPTION

An embodiment of the invention is described below with reference to the drawings. In this embodiment, a case will be described in which the present invention is applied to a common rail in-cylinder direct injection multi-cylinder (for example, inline four-cylinder) diesel engine (compression self-ignition internal combustion engine) mounted in an automobile.

—Engine Configuration—

Figure 1:
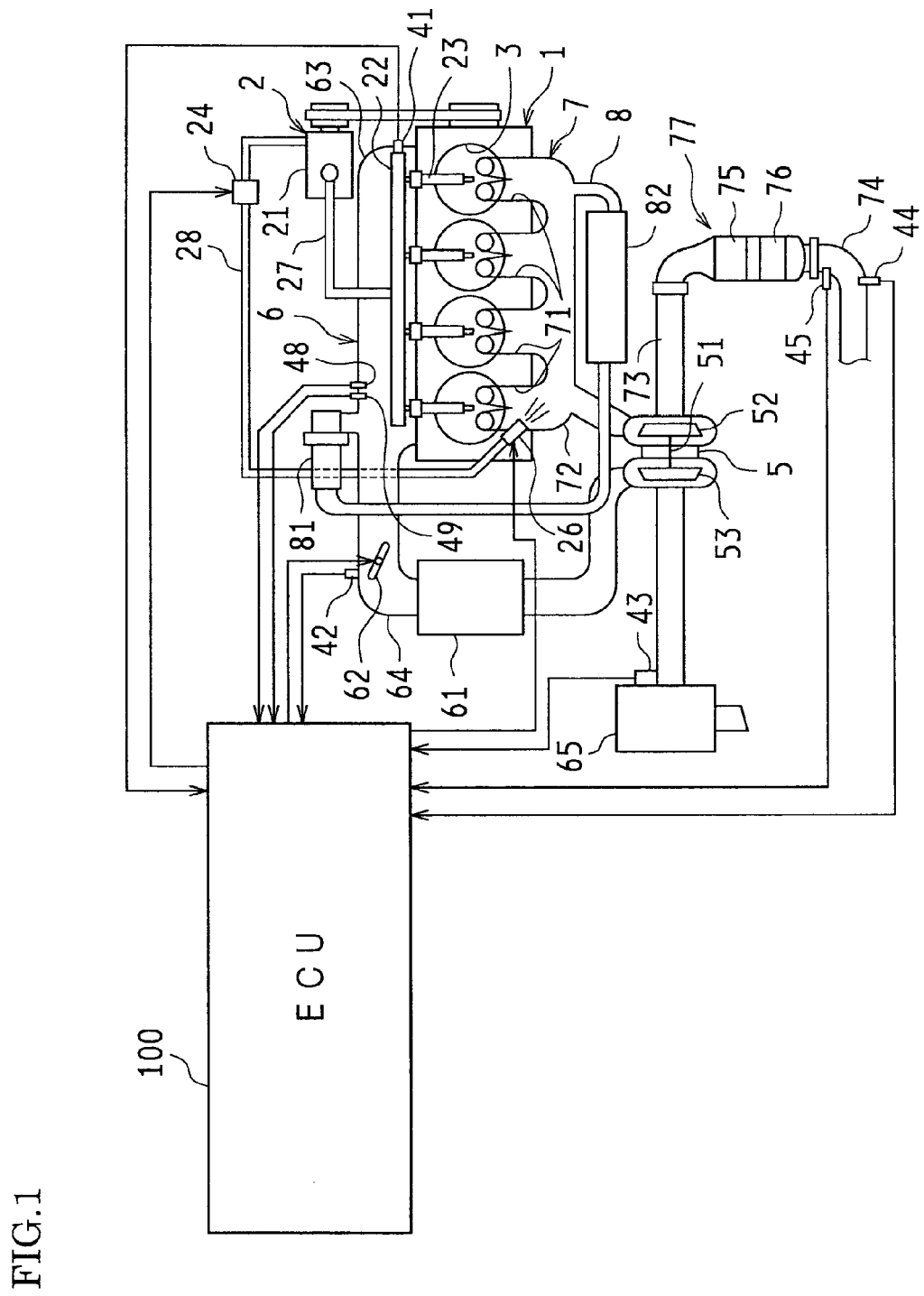
FIG. 1 is a diagram showing the schematic configuration of an engine and a control system thereof according to an embodiment.
Figure 2:
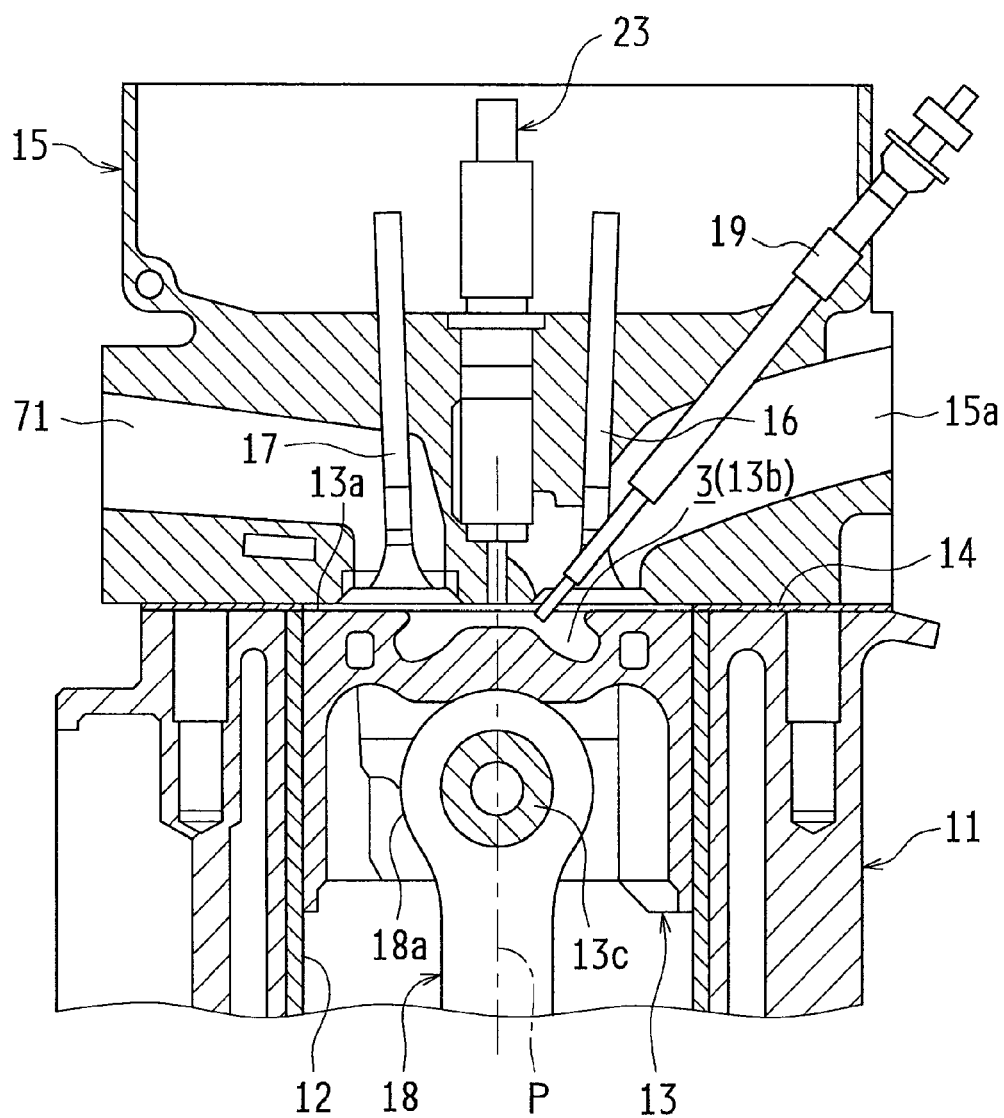
FIG. 2 is a cross-sectional diagram showing a combustion chamber of a diesel engine and its surroundings.

First, the overall configuration of a diesel engine (referred to below as simply the engine) according to the present embodiment will be described. FIG. 1 is a schematic configuration diagram of an engine 1 and a control system of the engine 1 according to the present embodiment. Also, FIG. 2 is a cross-sectional diagram showing a combustion chamber 3 of the diesel engine and its surroundings.

As shown in FIG. 1, the engine 1 according to the present embodiment is configured as a diesel engine system having a fuel supply system 2, combustion chambers 3, an intake system 6, an exhaust system 7, and the like as its main portions.

The fuel supply system 2 is configured including a supply pump 21, a common rail 22, injectors (fuel injection valves) 23, a cutoff valve 24, a fuel addition valve 26, an engine fuel path 27, an added fuel path 28, and the like.

The supply pump 21 draws fuel from a fuel tank, and after putting the drawn fuel under high pressure, supplies the fuel to the common rail 22 via the engine fuel path 27. The common rail 22 has the functionality of an accumulation chamber in which the high pressure fuel supplied from the supply pump 21 is held (accumulated) at a predetermined pressure, and this accumulated fuel is distributed to the injectors 23. The injectors 23 are configured from piezo injectors within which a piezoelectric element (piezo element) is provided, and supply fuel by injection into the combustion chambers 3 by appropriately opening a valve.

Also, the injectors 23 of the present embodiment each include ten injection holes (not shown) at equal intervals in the circumferential direction, and the diameter of the injection holes has been reduced compared to the diameter of the injection holes of a normal injector. This configuration is employed in order to improve combustion characteristics by atomizing the fuel spray so as to suppress the amount of, for example, HC that is produced. In the case of employing such a configuration, there is a smaller fuel injection amount per unit of time (fuel injection rate) when the valves of the injectors 23 are open. Specifically, whereas the injection hole diameter of a normal injector is 0.12 mm, the injection hole diameter of the injectors 23 of the present embodiment is 0.09 mm. There is no limitation to this value. Note that details of the control of fuel injection from the injectors 23 will be described later.

Also, the supply pump 21 supplies part of the fuel drawn from the fuel tank to the fuel addition valve 26 via the added fuel path 28. In the added fuel path 28, the cutoff valve 24 is provided in order to stop fuel addition by cutting off the added fuel path 28 during an emergency.

The fuel addition valve 26 is configured from an electronically controlled opening/closing valve whose valve opening period is controlled by an addition control operation performed by an ECU 100 that will be described later, such that the amount of fuel added to the exhaust system 7 becomes a target addition amount (an addition amount such that exhaust A/F becomes a target A/F), and such that a fuel addition timing becomes a predetermined timing. In other words, a desired amount of fuel is supplied from the fuel addition valve 26 by injection to the exhaust system 7 (to an exhaust manifold 72 from exhaust ports 71) in accordance with appropriate timing.

The intake system 6 is provided with an intake manifold 63 connected to an intake port 15a formed in a cylinder head 15 (see FIG. 2), and an intake pipe 64 that constitutes an intake path is connected to the intake manifold 63. Also, in this intake path, an air cleaner 65, an air flow meter 43, and a throttle valve (intake throttle valve) 62 are disposed in the stated order from the upstream side. The air flow meter 43 outputs an electrical signal according to the amount of air that flows into the intake path via the air cleaner 65.

The exhaust system 7 is provided with the exhaust manifold 72 connected to the exhaust ports 71 formed in the cylinder head 15, and exhaust pipes 73 and 74 that constitute an exhaust path are connected to the exhaust manifold 72. Also, in this exhaust path, a maniverter (exhaust purification apparatus) 77 is disposed that is provided with a NOx storage catalyst (NSR catalyst: NOx Storage Reduction catalyst) 75 and a DPNR catalyst (Diesel Paticulate-NOx Reduction catalyst) 76. The following describes the NSR catalyst 75 and the DPNR catalyst 76.

The NSR catalyst 75 is a storage reduction NOx catalyst and is composed using, for example, alumina ($Al_2O_3$) as a support, with, for example, an alkali metal such as potassium (K), sodium (Na), lithium (Li), or cesium (Cs), an alkaline earth element such as barium (Ba) or calcium (Ca), a rare earth element such as lanthanum (La) or yttrium (Y), and a precious metal such as platinum (Pt) supported on this support.

In a state in which a large amount of oxygen is present in exhaust gas, the NSR catalyst 75 stores NOx, and in a state in which the oxygen concentration in exhaust gas is low, and furthermore a large amount of reduction component (e.g., an unburned component of fuel (HC)) is present, the NSR catalyst 75 reduces NOx to $NO_2$ or NO and releases the resulting $NO_2$ or NO. NOx that has been released as $NO_2$ or NO is further reduced due to quickly reacting with HC or CO in exhaust gas and becomes $N_2$. Also, by reducing $NO_2$ or NO, HC and CO themselves are oxidized and thus become $H_2O$ and $CO_2$. In other words, by suitably adjusting the oxygen concentration or the HC component in exhaust gas introduced into the NSR catalyst 75, it is possible to purify HC, CO, and NOx in the exhaust gas. In the configuration of the present embodiment, adjustment of the oxygen concentration or the HC component in exhaust gas can be performed with an operation for adding fuel from the fuel addition valve 26.

On the other hand, in the DPNR catalyst 76, a NOx storage reduction catalyst is supported on a porous ceramic structure, for example, and PM in exhaust gas is captured while passing through a porous wall. When the air-fuel ratio of the exhaust gas is lean, NOx in the exhaust gas is stored in the NOx storage reduction catalyst, and when the air-fuel ratio is rich, the stored NOx is reduced and released. Furthermore, a catalyst that oxidizes/burns the captured PM (e.g., an oxidization catalyst whose main component is a precious metal such as platinum) is supported on the DPNR catalyst 76.

The following describes the combustion chamber 3 of the diesel engine and its surroundings with reference to FIG. 2. As shown in FIG. 2, in a cylinder block 11 that constitutes part of the engine, a cylindrical cylinder bore 12 is formed in each cylinder (each of four cylinders), and a piston 13 is housed within each cylinder bore 12 such that the piston 13 can slide vertically.

The combustion chamber 3 is formed on the top side of a top face 13a of the piston 13. In other words, the combustion chamber 3 is defined by a lower face of the cylinder head 15 installed on top of the cylinder block 11 via a gasket 14, an inner wall face of the cylinder bore 12, and the top face 13a of the piston 13. A cavity (recess) 13b is provided in substantially the center of the top face 13a of the piston 13, and this cavity 13b also constitutes part of the combustion chamber 3.

Note that the cavity 13b is shaped such that the dimensions of the recess are small in the center portion (on a cylinder centerline P) and increase toward the outer peripheral side. In other words, when the piston 13 is near compression top dead center as shown in FIG. 2, the space in the combustion chamber 3 formed by the cavity 13b is small with a relatively low volume in the center portion, and gradually increases toward to the outer peripheral side (becomes large).

A small end 18a of a connecting rod 18 is linked to the piston 13 by a piston pin 13c, and a large end of the connecting rod 18 is linked to a crankshaft that is an engine output shaft. Thus, back and forth movement of the piston 13 within the cylinder bore 12 is transmitted to the crankshaft via the connecting rod 18, and engine output is obtained due to rotation of this crankshaft. Also, a glow plug 19 is disposed facing the combustion chamber 3. The glow plug 19 glows due to the flow of electrical current immediately before the engine 1 is started, and functions as a starting assistance apparatus whereby ignition and combustion are promoted due to part of a fuel spray being blown onto the glow plug.

Disposed in the cylinder head 15 are the intake port 15a that introduces air into the combustion chamber 3 and the exhaust port 71 that discharges exhaust gas from the combustion chamber 3, as well as an intake valve 16 that opens/closes the intake port 15a and an exhaust valve 17 that opens/closes the exhaust port 71. The intake valve 16 and the exhaust valve 17 are disposed facing each other on either side of the cylinder centerline P. That is, this engine 1 is configured as a cross flow-type engine. Also, the injector 23 that injects fuel directly into the combustion chamber 3 is installed in the cylinder head 15. The injector 23 is disposed substantially in the center above the combustion chamber 3, in an erect orientation along the cylinder centerline P, and injects fuel introduced from the common rail 22 toward the combustion chamber 3 in accordance with a predetermined timing.

Furthermore, as shown in FIG. 1, the engine 1 is provided with a turbocharger 5. This turbocharger 5 is provided with a turbine wheel 52 and a compressor wheel 53 that are linked via a turbine shaft 51. The compressor wheel 53 is disposed facing the inside of the intake pipe 64, and the turbine wheel 52 is disposed facing the inside of the exhaust pipe 73. Thus the turbocharger 5 uses exhaust flow (exhaust pressure) received by the turbine wheel 52 to rotate the compressor wheel 53, thereby performing a so-called supercharging operation that increases the intake pressure. In the present embodiment, the turbocharger 5 is a variable nozzle-type turbocharger, in which a variable nozzle vane mechanism (not shown) is provided on the turbine wheel 52 side, and by adjusting the opening degree of this variable nozzle vane mechanism it is possible to adjust the supercharging pressure of the engine 1.

An intercooler 61 for forcibly cooling intake air heated due to supercharging with the turbocharger 5 is provided in the intake pipe 64 of the intake system 6. The throttle valve 62 provided on the downstream side from the intercooler 61 is an electronically controlled opening/closing valve whose opening degree can be steplessly adjusted, and has a function of constricting the area of the channel of intake air under a predetermined condition, and thus adjust (reduce) the amount of intake air supplied.

Also, the engine 1 is provided with an exhaust gas recirculation path (EGR path) 8 that connects the intake system 6 and the exhaust system 7. The EGR path 8 reduces the combustion temperature by appropriately directing part of the exhaust gas back to the intake system 6 and resupplying that exhaust gas to the combustion chamber 3, thus reducing the amount of NOx produced. Also, provided in the EGR path 8 are an EGR valve 81 that by being opened/closed steplessly under electronic control is capable of freely adjusting the flow rate of exhaust gas that flows through the EGR path 8, and an EGR cooler 82 for cooling exhaust that passes through (recirculates through) the EGR path 8. The EGR apparatus (exhaust gas recirculation apparatus) is constituted by the EGR path 8, the EGR valve 81, the EGR cooler 82, and the like.

—Sensors—

Various sensors are installed at respective sites of the engine 1, and these sensors output signals related to environmental conditions at the respective sites and the operating state of the engine 1.

For example, the air flow meter 43 outputs a detection signal according to the flow rate of intake air (the amount of intake air) on the upstream side of the throttle valve 62 within the intake system 6. An intake temperature sensor 49 is disposed in the intake manifold 63 and outputs a detection signal according to the temperature of intake air. An intake pressure sensor 48 is disposed in the intake manifold 63 and outputs a detection signal according to the intake air pressure. An A/F (air-fuel ratio) sensor 44 outputs a detection signal that changes in a continuous manner according to the oxygen concentration in exhaust gas on the downstream side of the maniverter 77 of the exhaust system 7. An exhaust temperature sensor 45 likewise outputs a detection signal according to the temperature of exhaust gas (exhaust temperature) on the downstream side of the maniverter 77 of the exhaust system 7. A rail pressure sensor 41 outputs a detection signal according to the pressure of fuel accumulated in the common rail 22. A throttle opening degree sensor 42 detects the opening degree of the throttle valve 62.

—ECU—

Figure 3:
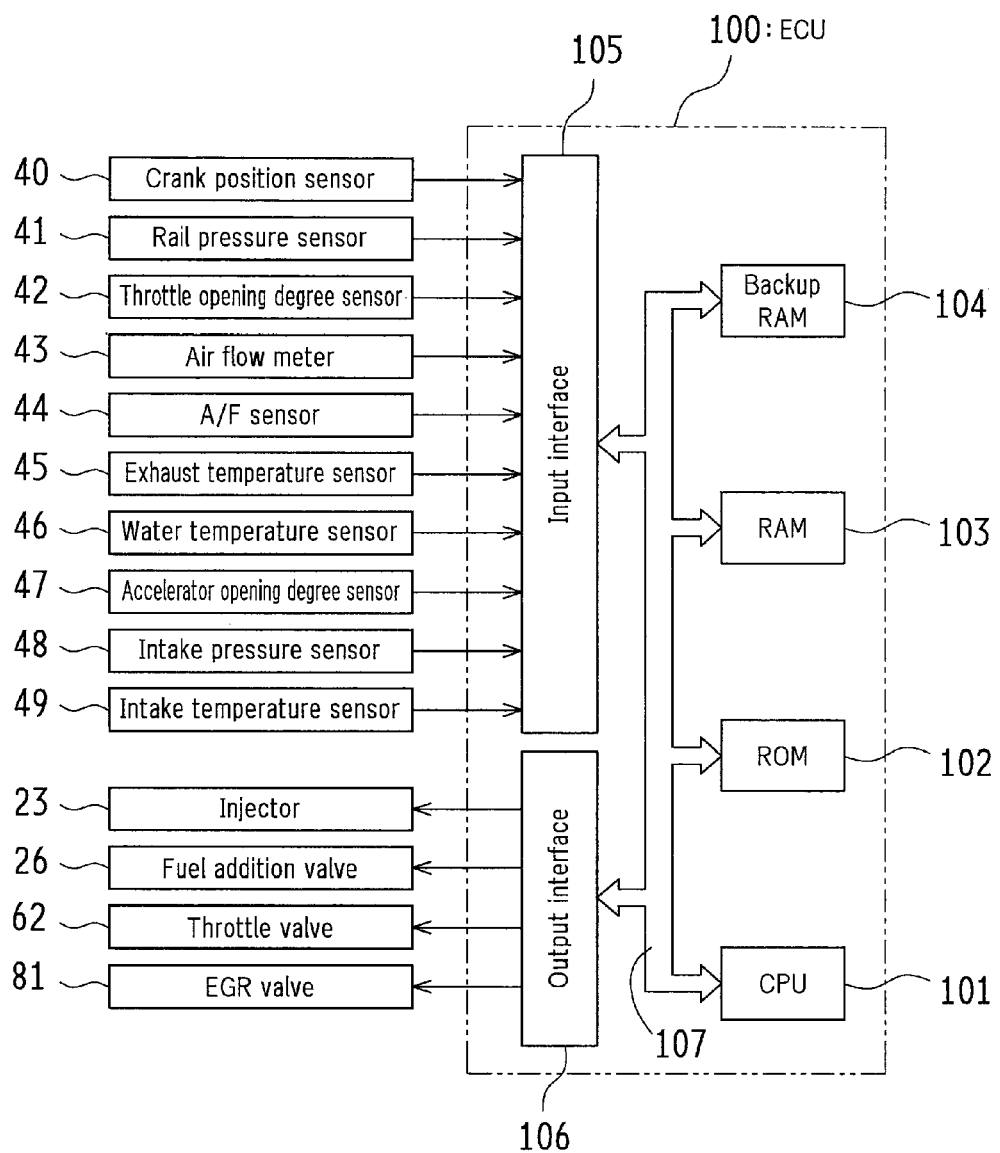
FIG. 3 is a block diagram showing the configuration of a control system such as an ECU.

As shown in FIG. 3, the ECU 100 is provided with a CPU 101, a ROM 102, a RAM 103, a backup RAM 104, and the like. Stored in the ROM 102 are various control programs, maps that are referenced when executing those various control programs, and the like. The CPU 101 executes various types of arithmetic processing based on the various control programs and maps stored in the ROM 102. The RAM 103 is a memory that temporarily stores data resulting from computation with the CPU 101 or data that has been input from the respective sensors. The backup RAM 104 is a nonvolatile memory that stores that data or the like to be saved when the engine 1 is stopped, for example.

The CPU 101, the ROM 102, the RAM 103, and the backup RAM 104 are connected to each other via a bus 107, and are connected to an input interface 105 and an output interface 106 via the bus 107.

The input interface 105 is connected to the rail pressure sensor 41, the throttle opening degree sensor 42, the air flow meter 43, the A/F sensor 44, the exhaust temperature sensor 45, the intake pressure sensor 48, and the intake temperature sensor 49. Furthermore, the input interface 105 is connected to a water temperature sensor 46 that outputs a detection signal according to the coolant temperature of the engine 1, an accelerator opening degree sensor 47 that outputs a detection signal according to the amount of accelerator pedal depression, a crank position sensor 40 that outputs a detection signal (pulse) each time the output shaft (crankshaft) of the engine 1 rotates a specific angle, and the like. On the other hand, the output interface 106 is connected to the injectors 23, the fuel addition valve 26, the throttle valve 62, the EGR valve 81, and the like.

The ECU 100 also executes various types of control of the engine 1 based on output from the various types of sensors described above. For example, the ECU 100 adjusts the amount (EGR amount) of exhaust gas that is recirculated to the intake manifold 63 by controlling the opening degree of the EGR valve 81 in accordance with the operating state of the engine 1. The EGR amount is set in accordance with an EGR map that is stored in the ROM 102 in advance. Specifically, the EGR map is a map for determining the EGR amount (EGR rate) using the engine speed and the engine load as parameters, and is for setting an EGR amount that can reduce the amount of NOx discharged into the exhaust system. Note that the EGR map is created in advance through experimentation, simulation, or the like. In other words, the EGR amount (opening degree of the EGR valve 81) is obtained by applying, to the EGR map, the engine speed calculated based on the detection value from the crank position sensor 40 and the opening degree of the throttle valve 62 (corresponding to the engine load) detected by the throttle opening degree sensor 42. Also, in particular, the EGR amount is set relatively high in the engine 1 of the present embodiment. Specifically, the EGR map is created so as to obtain an opening degree of the EGR valve 81 at which the EGR rate is always 20% or more regardless of the load state of the engine 1, and stored in the ROM 102.

Furthermore, the ECU 100 executes fuel injection control on the injector 23. As the fuel injection control executed on the injector 23, auxiliary injection such as pilot injection, pre-injection, after-injection, and post-injection, which are executed in conventional ordinary diesel engines, is not executed in the present embodiment, and only main injection for obtaining engine torque is executed. Specifically, the execution of pre-heating operations before the start of main injection is prevented by omitting the execution of pilot injection and pre-injection.

The total fuel injection amount in this main injection is set as the fuel injection amount necessary for obtaining the required torque, which is determined according to environmental conditions and operating conditions such as engine speed, accelerator operation amount, coolant temperature, and intake air temperature. For example, the greater the engine speed (engine speed calculated based on the detection value from the crank position sensor 40) or the greater the accelerator operation amount (the accelerator pedal depression amount detected by the accelerator opening degree sensor 47) (i.e., the greater the accelerator opening degree), the greater the torque requirement value of the engine 1.

—Fuel Injection Pressure—

The fuel injection pressure when executing the main fuel injection is determined by the internal pressure of the common rail 22. In regard to the internal pressure of the common rail, normally, the higher the engine load (combustion engine load) and the higher the engine speed (combustion engine speed), the greater the target value for the pressure of fuel supplied from the common rail 22 to the injectors 23 (i.e., the target rail pressure). Specifically, when the engine load is high, a large amount of air is drawn into the combustion chamber 3, making it necessary to inject a large amount of fuel from the injectors 23 into the combustion chamber 3, and therefore the pressure of injection from the injectors 23 needs to be high. Also, when the engine speed is high, the period during which injection is possible is short, making it necessary to inject a large amount of fuel per unit of time, and therefore the pressure of injection from the injectors 23 needs to be high. In this way, the target rail pressure is normally set based on the engine load and the engine speed. Note that the target rail pressure is set in accordance with, for example, a fuel pressure setting map stored in the ROM 102. Specifically, the valve opening period (injection rate waveform) of the injectors 23 is controlled by determining the fuel pressure according to this fuel pressure setting map, thus enabling the amount of fuel injected during the valve opening period to be specified. Note that in the present embodiment, the fuel pressure is adjusted between 30 MPa and 200 MPa according to the engine load and the like.

The optimum values of fuel injection parameters in the main injection differ according to the temperature conditions of the engine 1, intake air, and the like.

For example, the ECU 100 adjusts the amount of fuel discharged by the supply pump 21 such that the common rail pressure becomes the same as the target rail pressure set based on the engine operating state, that is to say, such that the fuel injection pressure matches the target injection pressure. Also, the ECU 100 determines the fuel injection amount and the fuel injection form based on the engine operating state. Specifically, the ECU 100 calculates the engine rotational speed based on the detection value from the crank position sensor 40, obtains the accelerator pedal depression amount (accelerator opening degree) based on the detection value from the accelerator opening degree sensor 47, and determines the total main injection amount (injection amount in main injection) based on the engine rotational speed and the accelerator opening degree.

—Divided Main Injection—

In the diesel engine 1, it is important to achieve both demand for an improvement in exhaust emissions by reducing the amount of NOx produced and the amount of smoke produced and for reducing combustion noise during the combustion stroke. As a technique for achieving both of these demands, the inventors of the present invention focused on the fact that appropriately controlling the combustion form in the combustion chamber 3 is effective, and found the below-described technique of fuel injection by divided main injection as a technique for controlling the combustion form. This is specifically described below.

In the present embodiment, the injection form in main injection is changed according to the engine load. Specifically, the total main injection amount necessary in main injection (the total fuel injection amount for obtaining the required torque) during low-load operation of the engine 1 is ensured by executing three divided main injections as the injection form of main injection.

On the other hand, the total main injection amount necessary in main injection (the total fuel injection amount for obtaining the required torque) during mid-load operation and high-load operation of the engine 1 is ensured by executing two divided main injections as the injection form of main injection.

Specifically, the combustion form of injected fuel (fuel spray) is set differently in each divided main injection by setting the number of times the main injection is divided and the injection timing (time at which fuel injection is started) and injection period (correlated with the injection amount per one division of divided main injection) in each divided main injection according to the load of the engine 1.

Note that high-load operation in the present embodiment refers to a region in which the engine load is in a relatively high region within the range of an operation region in which exhaust emissions are improved. In other words, this high-load operation is a region in which the engine load is lower than that in an operation region in which the torque required by the driver is output without giving consideration to exhaust emissions.

The divided main injection that is a feature in the present embodiment is the divided main injection during mid-load operation and high-load operation of the engine 1 (divided main injection divided into two divisions). Details of the injection form during these loads will be described later.

The following is an outline of the combustion form in the combustion process in the combustion chamber 3 in the present embodiment. In this combustion form, initial slow-burning combustion (also called initial low-temperature combustion, which is a combustion form with a relatively low combustion speed), premixed combustion, and diffusion combustion are performed in order in the same combustion process. In other words, initial slow-burning combustion and diffusion combustion are performed in the same combustion process, and furthermore the initial slow-burning combustion and diffusion combustion are connected by premixed combustion, and thus three mutually different forms of combustions are performed in a continuous manner. Specifically, premixed combustion, which is the second stage of combustion, is performed between initial slow-burning combustion, which is the first stage of combustion, and diffusion combustion, which is the third stage of combustion, thus realizing continuity between these mutually different combustion forms.

More specifically, initial slow-burning combustion, which is the first stage of combustion, is carried out by fuel being injected while performing an encounter rate reduction operation for reducing the encounter rate between oxygen and the fuel spray in the cylinder, and fuel in the cylinder gradually combusts due to this fuel combustion. Specifically, initial slow-burning combustion is performed by setting the initial combustion fuel injection period to a predetermined period in which the in-cylinder temperature is in the range of 750 K or more to less than 900 K, and performing slow-burning combustion main injection. Note that as described above, the upper limit value of the in-cylinder temperature in the "initial combustion fuel injection period" is a value that can be appropriately set according to the fuel spray state in the cylinder, and since there are cases where this upper limit value rises due to high-volume EGR, this value is not limited to 900 K, and may be 950 K, 1000 K, or the like. The following description takes the example of the case of 900 K.

Also, premixed combustion, which is the second stage of combustion, is combustion achieved by fuel injection being performed after the start of initial slow-burning combustion, when the in-cylinder temperature is less than a predetermined diffusion combustion start temperature (e.g., 900 K) at which diffusion combustion is achieved. Specifically, premixed combustion is performed by setting the premixed combustion fuel injection period to a predetermined period in which the combustion field temperature in initial slow-burning combustion is in the range of 800 K or more to less than 900 K, and performing premixed combustion main injection.

During low-load operation of the engine 1, the initial combustion fuel injection period for performing initial slow-burning combustion and the premixed combustion fuel injection period for performing premixed combustion are set as independent fuel injection periods. Specifically, fuel injection is paused after the execution of fuel injection in the initial combustion fuel injection period for performing initial slow-burning combustion, and after a predetermined interval has elapsed, fuel injection is performed in the premixed combustion fuel injection period for performing premixed combustion.

In contrast, during mid-load operation and high-load operation of the engine 1, the initial combustion fuel injection period for performing initial slow-burning combustion and the premixed combustion fuel injection period for performing premixed combustion are set as continuous fuel injection periods. Specifically, fuel injection in the initial combustion fuel injection period for performing initial slow-burning combustion and fuel injection in the premixed combustion fuel injection period for performing premixed combustion are set to be continuous without stopping fuel injection. The reason for performing such continuous injection will be described later.

Furthermore, diffusion combustion, which is the third stage of combustion, is combustion achieved by fuel injection being performed after the start of premixed combustion, when the in-cylinder temperature is greater than or equal to the diffusion combustion start temperature due to the premixed combustion. Specifically, diffusion combustion is performed by setting the diffusion combustion fuel injection period to a predetermined period immediately after the combustion field temperature of premixed combustion has reached 900 K, and performing diffusion combustion main injection.

Furthermore, regarding the fuel injection amounts for realizing the combustion forms, during low-load operation of the engine 1, the fuel injection amount in premixed combustion main injection for performing premixed combustion, which is the second stage of combustion, is set higher than that in slow-burning combustion main injection for performing initial slow-burning combustion, which is the first stage of combustion. Also, the fuel injection amount in diffusion combustion main injection for performing diffusion combustion, which is the third stage of combustion, is set higher than that in premixed combustion main injection for performing premixed combustion, which is the second stage of combustion. Accordingly, the penetration force of fuel injected in premixed combustion main injection is set higher than the penetration force of fuel injected in slow-burning combustion main injection, and furthermore the penetration force of fuel injected in diffusion combustion main injection is set higher than the penetration force of fuel injected in premixed combustion main injection. Details of this penetration force will be described later.

In contrast, during mid-load operation and high-load operation of the engine 1, the fuel injection amount in diffusion combustion main injection is set lower than the total fuel injection amount in slow-burning combustion main injection and premixed combustion main injection that are performed in a continuous manner. Accordingly, the penetration force of fuel injected in diffusion combustion main injection is set lower than the penetration force of fuel injected in slow-burning combustion main injection and premixed combustion main injection that are performed in a continuous manner. The ratio of the total fuel injection amount in slow-burning combustion main injection and premixed combustion main injection to the fuel injection amount in diffusion combustion main injection is set to "7:1", for example. There is no limitation to this value.

The following are separate descriptions of fuel injection forms in the various load states and their accompanying combustion forms in the combustion chamber 3.

Figure 4:
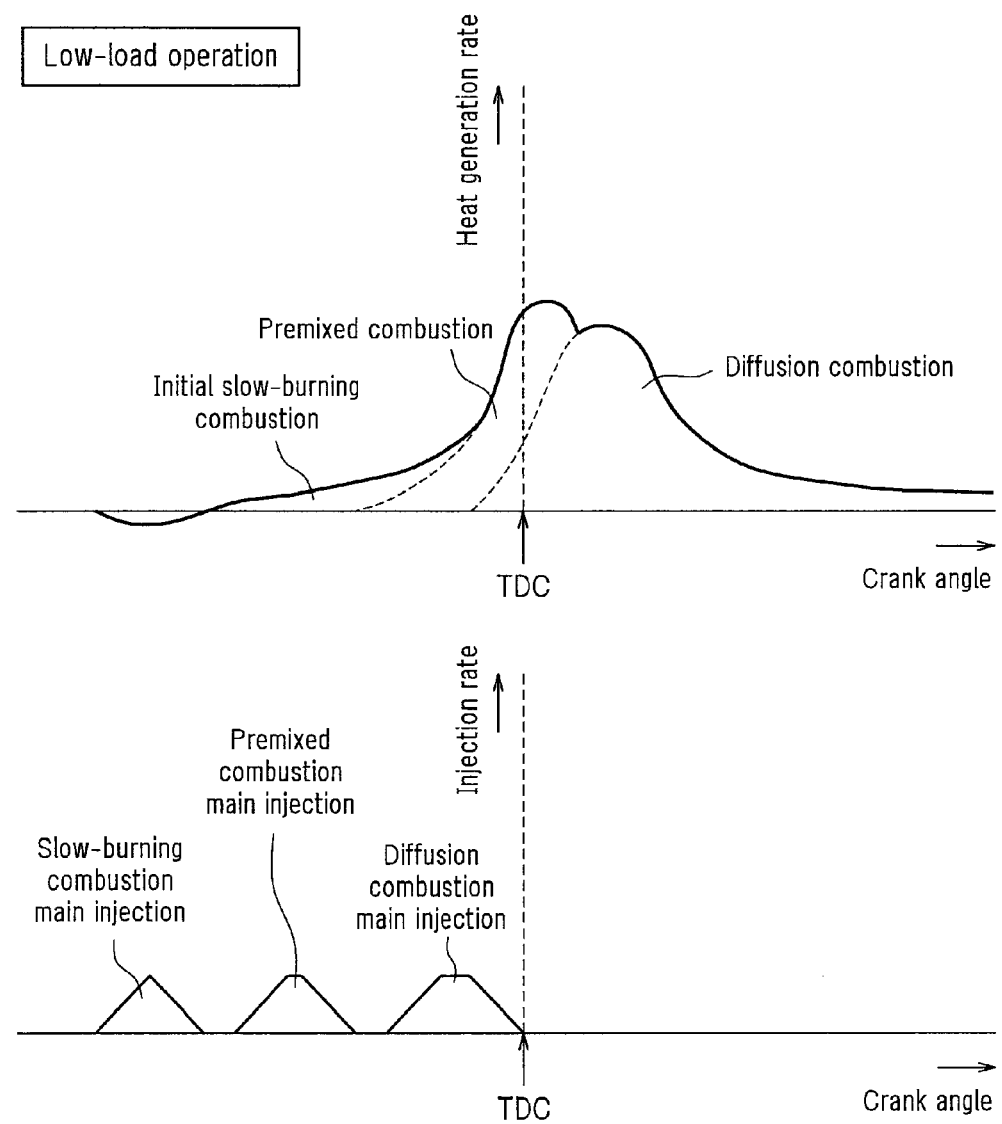
FIG. 4 is a diagram showing change in the heat generation rate in a cylinder and a fuel injection pattern during low-load operation of an engine.

FIG. 4 shows change in the heat generation rate in a cylinder and a fuel injection pattern in a main injection execution period during low-load operation of the engine 1. Also, FIG. 5 shows change in the heat generation rate in a cylinder and a fuel injection pattern in a main injection execution period during high-load operation of the engine 1.

Figure 5:
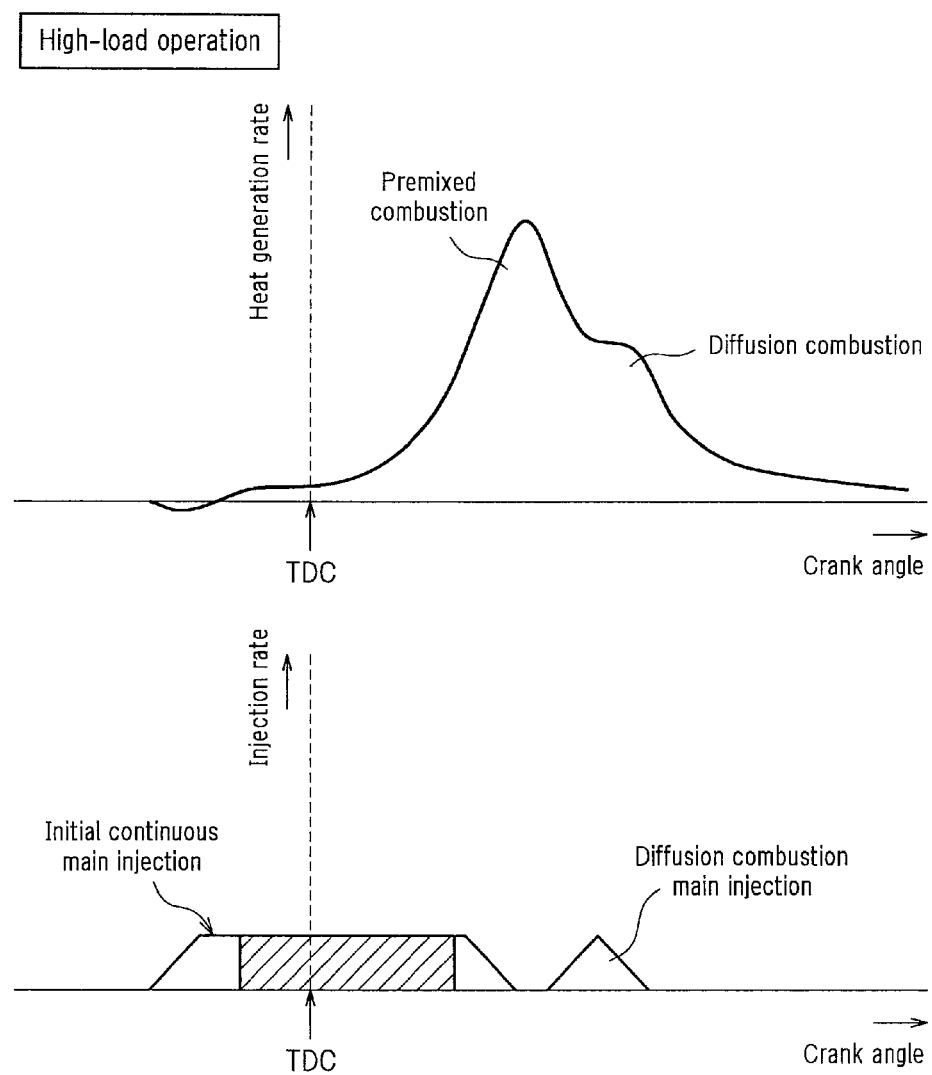
FIG. 5 is a diagram showing change in the heat generation rate in a cylinder and a fuel injection pattern during high-load operation of an engine.

With the waveforms indicating change in the heat generation rate in FIGS. 4 and 5, the horizontal axis indicates the crank angle, and the vertical axis indicates the heat generation rate. Also, with the waveforms of the fuel injection patterns in these figures, the horizontal axis indicates the crank angle, and the vertical axis indicates the injection rate (corresponding to the amount of retraction movement of a needle included in the injector 23). In these figures, "TDC" indicates a crank angle position corresponding to the compression top dead center of the piston 13.

Note that a description of the change in the heat generation rate in the cylinder and the fuel injection pattern during mid-load operation will not be given since the only difference from the case of high-load operation is that the fuel injection amount is set lower than that during high-load operation (slow-burning combustion main injection and premixed combustion main injection are performed by continuous injection likewise to the case of high-load operation), and the heat generation rate is accordingly lower than that during high-load operation.

Figure 6:
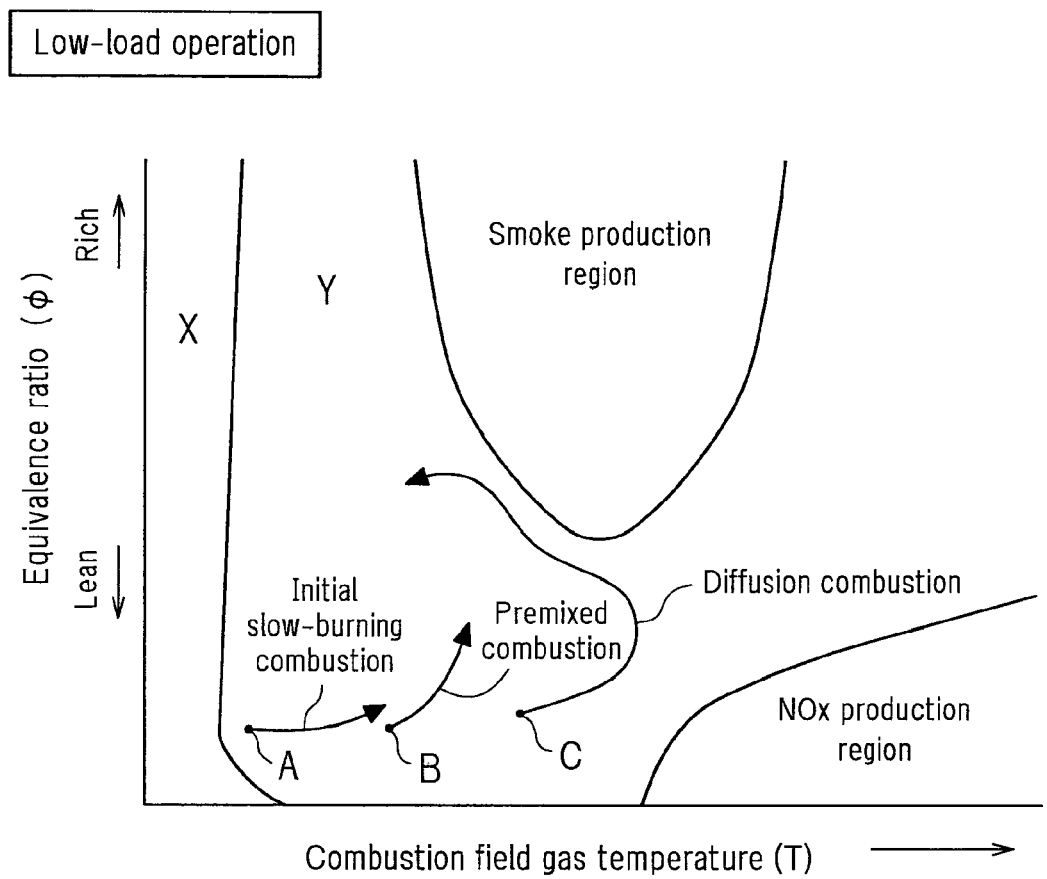
FIG. 6 is a $\phi T$ map showing change in the gas temperature and the equivalence ratio in combustion fields when various divided main injections are carried out, during low-load operation of an engine.

Also, FIG. 6 is a map (normally called a φT map) that shows, with respect to low-load operation of the engine 1, change in gas temperatures in the combustion fields where fuel is injected in the various fuel injection periods (e.g., ten combustion fields in the combustion chamber 3 (more specifically, in the cavity 13*b*) in the case of an injector 23 having ten injection holes), and the equivalence ratios in the combustion fields. Specifically, arrows indicate change in the combustion field environment (gas temperature and equivalence ratio in the combustion field) of the combustion field of fuel injected in slow-burning combustion main injection for performing initial slow-burning combustion, which is the first stage of combustion, the combustion field of fuel injected in premixed combustion main injection for performing premixed combustion, which is the second stage of combustion, and the combustion field of fuel injected in diffusion combustion main injection for performing diffusion combustion, which is the third stage of combustion, in the case of executing main injection (each divided main injection) according to the fuel injection pattern shown in FIG. 4.

Figure 7:
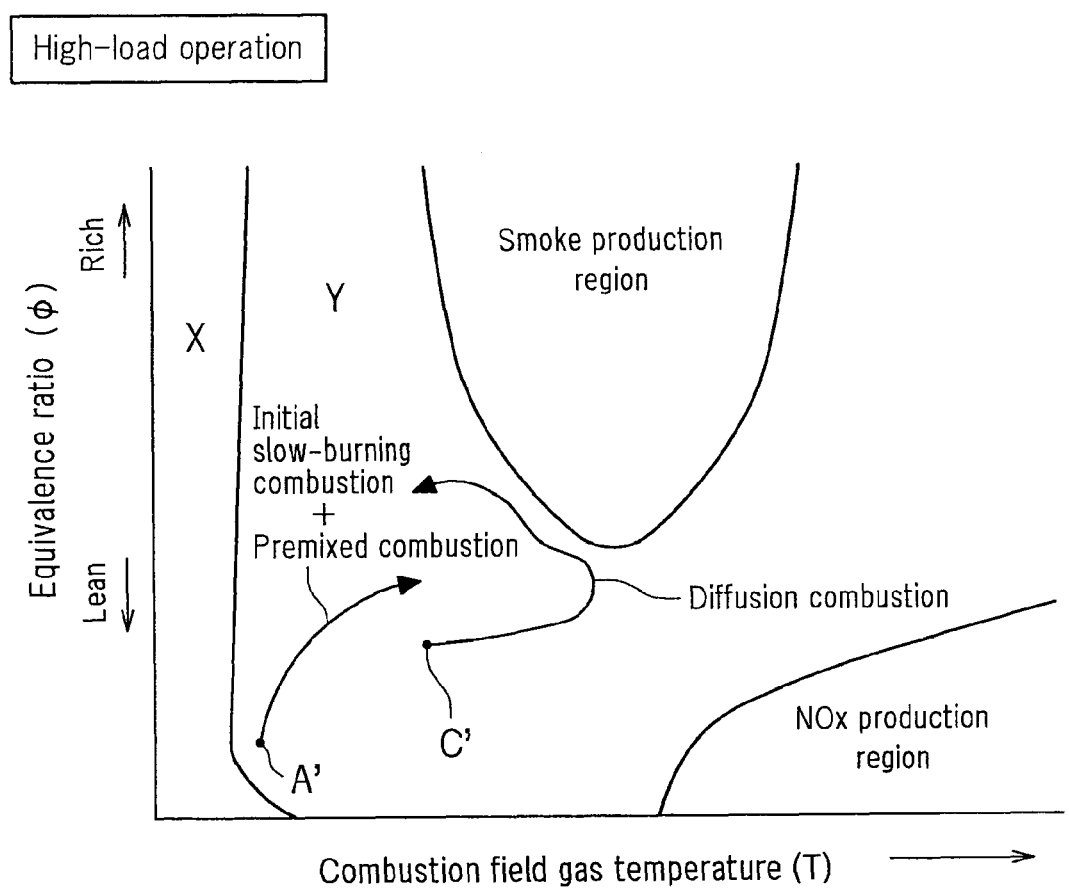
FIG. 7 is a $\phi T$ map showing change in the gas temperature and the equivalence ratio in combustion fields when various divided main injections are carried out, during high-load operation of an engine.

On the other hand, FIG. 7 is a $\phi$T map showing, with respect to high-load operation of the engine 1, change in gas temperatures in the combustion fields where fuel is injected in the various fuel injection periods and the equivalence ratios in the combustion fields. Specifically, arrows indicate change in the combustion field environment (gas temperature and equivalence ratio in the combustion field) of the combustion field of fuel injected in slow-burning combustion main injection and premixed combustion main injection that are performed in a continuous manner, and the combustion field of fuel injected in diffusion combustion main injection for performing diffusion combustion, in the case of executing main injection (each divided main injection) according to the fuel injection pattern shown in FIG. 5.

In FIGS. 6 and 7, smoke is produced in exhaust gas if the combustion field environment reaches the smoke production regions shown in the figures. These smoke production regions are regions in which the combustion field gas temperature is relatively high, and the equivalence ratio of the combustion field is on the rich side. Also, NOx is produced in exhaust gas if the combustion field environment reaches the NOx production regions shown in these figures. These NOx production regions are regions in which the combustion field gas temperature is relatively high, and the equivalence ratio of the combustion field is on the lean side. Also, in FIGS. 6 and 7, the region X is a region in which HC is readily produced in exhaust gas, and the region Y is a region in which CO is readily produced in exhaust gas.

The following describes injection forms in each divided main injection during low-load operation and high-load operation. Note that the total main injection amount during low-load operation is set to 18 mm$^3$, for example, and the total main injection amount during high-load operation is set to 40 mm$^3$, for example. Note that the total main injection amount during mid-load operation is set to 30 mm$^3$, for example. There is no limitation to these values.

(Low-Load Operation)

As shown in FIG. 4, injection is completed on the angle of advance side of compression top dead center (TDC) of the piston 13 in the divided main injections during low-load operation of the engine 1.

First, slow-burning combustion main injection is the main injection that is farthest on the angle of advance side among the divided main injections. Premixed combustion main injection is the main injection that is on the angle of delay side of the slow-burning combustion main injection, and the injection amount is set higher than that in slow-burning combustion main injection. Diffusion combustion main injection is the main injection that is farther on the angle of delay side than premixed combustion main injection is, and the injection amount is set even higher than that in premixed combustion main injection. The injection amounts in these divided main injections will be described later.

A predetermined interval is provided between slow-burning combustion main injection and premixed combustion main injection, and between premixed combustion main injection and diffusion combustion main injection. Specifically, slow-burning combustion main injection is executed, then fuel injection is paused (the injector 23 is cut off), and then premixed combustion main injection is started after the predetermined interval has elapsed. Also, fuel injection is paused (the injector 23 is cut off) after premixed combustion main injection has been executed, and then diffusion combustion main injection is started after the predetermined interval has elapsed. This interval is set as an interval in which fuel spray cooling can be performed, such as the minimum valve closing period (the minimum period from the closing to the opening of the valve of the injector 23 (e.g., 200 µs), which is determined by the performance of the injector 23). More specifically, the interval is set such that the start time of diffusion combustion main injection is substantially synchronized with the start time of premixed combustion. This divided main injection interval is not limited to the above value, and as will be described later, can be appropriately set such that functions are exhibited in the various combustion forms.

<Slow-Burning Combustion Main Injection>

As shown in FIG. 4, injection starts on the angle of advance side of compression top dead center (TDC) of the piston 13 (e.g., 20° BTDC) in slow-burning combustion main injection during low-load operation. By starting slow-burning combustion main injection at this time, the combustion of fuel injection in slow-burning combustion main injection (initial slow-burning combustion) is started in a stage before the piston 13 reaches compression top dead center (TDC), as described above. The fuel injection amount (corresponding to the valve opening period of the injector 23) in slow-burning combustion main injection during low-load operation is set to 5 mm$^3$, for example. There is no limitation to this value. In this way, the fuel injection amount is low in slow-burning combustion main injection, and therefore the penetration force of the fuel is relatively low, and initial slow-burning combustion is performed in the center portion of the combustion chamber 3. For example, initial slow-burning combustion is performed in a relatively small region indicated by region α in FIG. 8 (cross-section view of the right half of the upper portion of the piston).

Also, in the injection period of slow-burning combustion main injection, an encounter rate reduction operation is performed in order to reduce the encounter rate between oxygen and the fuel spray in the cylinder. At least any one of an exhaust gas recirculation operation performed by the EGR apparatus, an intake throttle valve operation in the intake system, and an operation for reducing the in-cylinder temperature is executed as the encounter rate reduction operation. In particular, examples of an intake throttle valve operation in the intake system include an intake throttle valve operation performed by the throttle valve 62 disposed in the intake system, a turbocharging reduction operation performed by the turbocharger 5, and an intake throttle valve operation performed by an SCV (swirl control valve) (not shown) that is disposed in the intake system. Also, examples of the operation for reducing the in-cylinder temperature include an operation for raising the cooling performance of the intercooler 61 and the EGR cooler 82, and an operation for reducing the in-cylinder compression ratio.

For example, in the case where only the exhaust gas recirculation operation is performed by the EGR apparatus, the target EGR rate is set to 30% when controlling the opening degree of the EGR valve 81. Also, in the case where only an intake throttle valve operation is performed, the opening degree of the throttle valve 62 is set to 75%, for example. Furthermore, in the case of performing the above-described operation for reducing the in-cylinder temperature, such as raising the cooling performance of the EGR cooler 82 and the cooling performance of the intercooler 61, the kinetic energy of the oxygen molecules and fuel particles in the cylinder decreases, and the encounter rate is effectively reduced. Note that there is no limit to the values described above.

Since slow-burning combustion main injection is executed while such an encounter rate reduction operation is performed, the combustion of the fuel injected in the slow-burning combustion main injection is combustion in which the in-cylinder temperature is relatively low (e.g., approximately 800 K), and the heat generation rate changes little. This allows the in-cylinder temperature to rise gradually (e.g., rise to approximately 850 K) without inviting an increase in the amount of NOx produced and an increase in combustion noise that accompany a steep rise in the heat generation rate. Also, even if the air-fuel ratio in the injection region of the fuel injected in slow-burning combustion main injection (region α) is rich, the combustion is slow-burning combustion (low-temperature combustion) as described above, and therefore the smoke production temperature is not reached in this injection region, and the production of smoke is also suppressed (see initial slow-burning combustion in FIG. 6).

Note that the injection amount (corresponding to the valve opening period of the injector 23) in slow-burning combustion main injection is set through experimentation or simulation, for example.

<Premixed Combustion Main Injection>

After the combustion of fuel injected in the slow-burning combustion main injection (initial slow-burning combustion) has started, fuel injection in premixed combustion main injection is started in the vicinity of the time when the heat generation rate due to the slow-burning combustion reaches the highest value (peak value), or a little before the heat generation rate reaches the highest value. For example, injection is started in the vicinity of 15° BTDC. Specifically, since the fuel injection amount is relatively low in slow-burning combustion main injection, the peak value of the heat generation rate due to initial slow-burning combustion is also relatively low, and when the heat generation rate reaches the peak value, it then gradually decreases. However, injection in premixed combustion main injection is started before the heat generation rate due to initial slow-burning combustion reaches the peak value, and combustion is performed using the amount of in-cylinder heat obtained due to the initial slow-burning combustion.

The fuel injection amount in premixed combustion main injection is set to 6 mm$^3$, for example. There is no limitation to this value. In this way, the fuel injected in premixed combustion main injection has a higher penetration force than that of the fuel injected in slow-burning combustion main injection, and therefore passes through the combustion field of the fuel injected in slow-burning combustion main injection (combustion field in initial slow-burning combustion), and rises in temperature at this time due to receiving the heat of that combustion field. However, the in-cylinder temperature is still relatively low (approximately 850 K), and therefore the fuel injected in premixed combustion main injection does not reach the diffusion combustion region, but rather undergoes premixed combustion. Specifically, the fuel injected in premixed combustion main injection and the air in the cylinder are agitated, and combustion starts in the region where the excess air ratio reaches substantially "1". For example, premixed combustion is performed in the region indicated as region β in FIG. 8.

Since this kind of premixed combustion is performed, the combustion of the fuel injected in premixed combustion main injection (premixed combustion) is combustion in a region where a sufficient amount of oxygen is ensured, and therefore the amount of smoke produced is significantly reduced.

Note that the injection amount in premixed combustion main injection is also set through experimentation or simulation, for example.

<Diffusion Combustion Main Injection>

Fuel injection in diffusion combustion main injection is started after combustion of the fuel injected in premixed combustion main injection (premixed combustion), at a time after the in-cylinder temperature has reached the temperature at which diffusion combustion can occur (900 K). For example, injection is performed immediately before TDC. In other words, the fuel injected in diffusion combustion main injection undergoes diffusion combustion in which combustion gradually progresses immediately after injection.

The fuel injection amount in diffusion combustion main injection is set to 7 mm$^3$, for example. There is no limitation to this value. In this way, the fuel injected in diffusion combustion main injection has a higher penetration force than that of the fuel injected in premixed combustion main injection, and therefore passes through the combustion field of the fuel injected in slow-burning combustion main injection (region indicated by α in FIG. 8) and the combustion field of the fuel injected in premixed combustion main injection (region indicated by β in FIG. 8), and rises in temperature at this time due to receiving the heat of those combustion fields. This fuel then reaches a relative large space in the combustion chamber 3 (the outer circumferential side space in the cavity 13*b*, which is the region indicated by γ in FIG. 8), and in this portion, an effect of reducing the combustion temperature is sufficiently exhibited by exhaust gas recirculated by the EGR apparatus. For this reason, diffusion combustion is performed without inviting an increase in the amount of NOx produced and an increase in combustion noise. Note that the region δ in FIG. 8 is a region in which the fuel injected in diffusion combustion main injection undergoes combustion while being moved back toward the center of the cylinder by air flowing along the inner wall face of the cavity 13*b*.

Figure 8:
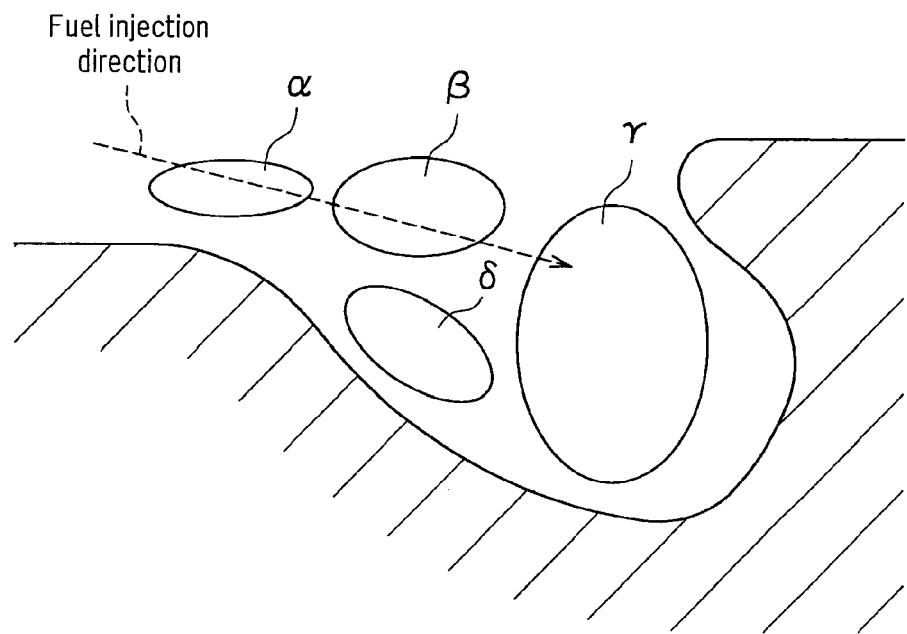
FIG. 8 is a cross-sectional diagram of the top portion of a piston showing combustion fields in a combustion chamber in various types of combustion during low-load operation of an engine.

Note that the above description takes the example of the case where the combustion field in initial slow-burning combustion is region α in FIG. 8, the combustion field in premixed combustion is region β in FIG. 8, and the combustion field in diffusion combustion is region γ in FIG. 8, that is to say, the case where the regions are separate from each other, but there are cases where portions of these regions overlap each other.

Also, since the fuel injection amount in diffusion combustion main injection is relatively high, the combustion field in premixed combustion is cooled due to an endothermic reaction with the fuel injected at the beginning of fuel injection, thus mitigating a steep rise in the heat generation rate in premixed combustion. In other words, it is possible to suppress an increase in combustion noise and the production of NOx in premixed combustion. As an example of injection timing in diffusion combustion main injection that is preferable for obtaining such an effect, the start time of diffusion combustion main injection is substantially synchronized with the start time (ignition time) of premixed combustion, and the end time of diffusion combustion main injection is substantially synchronized with the time when the heat generation rate is highest in premixed combustion.

Also, since combustion in the diffusion combustion main injection is diffusion combustion, controlling the fuel injection timing thereof enables controlling the heat generation rate peak time in this combustion. This is specifically described below.

Since pre-heating is sufficiently performed in the cylinder due to premixed combustion, in the case where diffusion combustion main injection is started in this state, the fuel injected in diffusion combustion main injection immediately undergoes thermal decomposition due to being subjected to a temperature environment that is greater than or equal to the self-ignition temperature, and combustion is started immediately after injection.

Specifically, physical delay and chemical delay are types of fuel ignition delay in diesel engines. Physical delay is the time required for the vaporization of fuel drops and mixing, and is influenced by the gas temperature in the combustion field. On the other hand, chemical delay is the time required for the chemical bonding and decomposition of fuel vapor as well as exothermic oxidation. In the state where pre-heating has been sufficiently performed in the cylinder as described above, physical delay can be minimized, thus enabling minimizing ignition delay as well.

Accordingly, the majority of the combustion form of fuel injected in diffusion combustion main injection is diffusion combustion. As a result, controlling the fuel injection timing in diffusion combustion main injection is substantially the same as controlling the combustion timing and heat generation rate peak time in diffusion combustion, thus enabling significantly improving the ability to control combustion. In other words, the ability to control combustion can be significantly improved by controlling the heat generation rate waveform in diffusion combustion. For example, starting injection in the vicinity of 8° BTDC causes diffusion combustion to start in the vicinity of TDC, thus enabling the heat generation rate peak time in diffusion combustion to be in the vicinity of 10° ATDC.

Note that the injection amount in diffusion combustion main injection is also set through experimentation or simulation, for example.

<Penetration Force>

Next is a specific description of the penetration force of fuel injected in the various main injections. When an injection command signal is received and fuel injection is started in the injector 23, a needle obstructing an injection hole retracts from the injection hole so as to gradually increase the opening area of the injection hole. Then, the opening area of the injection hole becomes largest when the needle moves to a most retracted position. However, if the injection command signal is canceled (a valve close instruction is received) before the needle reaches the most retracted position, the needle in the middle of retracting will move forward in the valve closing direction. In other words, in this case, fuel injection is ended without the opening area of the injection hole reaching the largest size. For this reason, the longer the injection period is set, the greater the opening area of the injection hole is.

The opening area of the injection hole is correlated with the flight distance of fuel (fuel spray) injected from the injection hole. Specifically, in the case where fuel is injected while the opening area of the injection hole is large, the dimensions of the fuel drop injected from the injection hole is also large, and therefore the fuel drop has a large amount of kinetic energy (the penetration force is high). The flight distance of this fuel drop is therefore long. On the other hand, in the case where fuel is injected while the opening area of the injection hole is small, the dimensions of the fuel drop injected from the injection hole is also small, and therefore the fuel drop has a small amount of kinetic energy (the penetration force is low). The flight distance of this fuel drop is therefore short.

As described above, in the case where the valve opening period of the injector 23 has been set relatively long (i.e., the injection amount per one instance of main injection has been set relatively high), the needle moves to the most retracted position, and the opening area of the injection hole reaches the largest size, and therefore the flight distance of the fuel drop is long in this case. In other words, the majority of the fuel injected from the injector 23 can fly to the vicinity of the outer circumferential end of the cavity 13b.

On the other hand, in the case where the valve opening period of the injector 23 has been set relatively short (i.e., the injection amount per one instance of main injection has been set relatively low), the needle does not move to the most retracted position, and the opening area of the injection hole is small, and therefore the flight distance of the fuel drop is short in this case. In other words, the majority of the fuel injected from the injector 23 can fly only to the vicinity of the central portion of the cavity 13b.

In this way, there is a correlation between the opening area of the injection hole, which is determined by the valve opening period of the injector 23, and the flight distance of the fuel (fuel spray) injected from the injection hole. For this reason, the flight distance of fuel can be adjusted by adjusting the valve opening period of the injector 23. In other words, there is a correlation between the opening area of the injection hole, which is determined by the injection amount per one instance of main injection, and the flight distance of the fuel (fuel spray) injected from the injection hole. For this reason, the flight distance of fuel can be stipulated by stipulating the injection amount per one instance of main injection.

In view of this, in the present embodiment, during low-load operation of the engine 1, the injection period in premixed combustion main injection is set longer than the injection period in slow-burning combustion main injection, and the injection period in diffusion combustion main injection is set longer than the injection period in premixed combustion main injection. For this reason, the fuel injection amount in premixed combustion main injection is greater than the fuel injection amount in slow-burning combustion main injection, and the penetration force is also higher. Also, the fuel injection amount in diffusion combustion main injection is greater than the fuel injection amount in premixed combustion main injection, and the penetration force is also higher.

For this reason, as described above, the combustion field of fuel injected in slow-burning combustion main injection is formed in a relatively small area in the inner circumferential portion of the cavity 13b (region α in FIG. 8). Also, the combustion field of fuel injected in premixed combustion main injection is formed on the outer circumferential side of the combustion field of fuel injected in slow-burning combustion main injection (region β in FIG. 8). Furthermore, the combustion field of fuel injected in diffusion combustion main injection is formed in a relatively large area in the outer circumferential portion of the cavity 13b (region γ in FIG. 8).

For this reason, as described above, fuel injected in premixed combustion main injection passes through the combustion field of fuel injected in slow-burning combustion main injection, that is to say, the combustion field in which initial slow-burning combustion is being performed, and receives heat from the combustion field at that time, thus achieving premixed combustion. Also, fuel injected in diffusion combustion main injection passes through not only the combustion field of fuel injected in slow-burning combustion main injection, but also the combustion field of fuel injected in premixed combustion main injection, that is to say, the combustion field in which initial premixed combustion is being performed, and receives heat from those combustion fields at that time, thus achieving diffusion combustion.

The following describes changes in the combustion field environment during the execution of the above-described main injections, with reference to FIG. 6. As described above, FIG. 6 is a map showing change in combustion field gas temperatures and combustion field equivalence ratios.

As shown in FIG. 6, when slow-burning combustion main injection has started (point A in FIG. 6), there is almost no change in the combustion field equivalence ratio since the fuel injection amount is relatively low, and the combustion field gas temperature rises slightly due to the combustion of the fuel (initial slow-burning combustion). As described above, in this initial slow-burning combustion, the combustion field environment does not reach a smoke production region or a NOx production reduction.

Subsequently, when premixed combustion main injection is started (point B in FIG. 6, which is when premixed combustion starts upon the gas temperature rising to point B due to receiving heat from the combustion field in initial slow-burning combustion), premixed combustion is performed, the combustion field equivalence ratio moves to the rich side, and the combustion field gas temperature rises due to the combustion of the fuel. At this time, the combustion field temperature rises to the temperature at which diffusion combustion can be performed (900 K). In this initial premixed combustion as well, the combustion field environment does not reach a smoke production region or a NOx production reduction.

Then, when diffusion combustion main injection is started (point C in FIG. 6, which is when diffusion combustion starts upon the gas temperature rising to point C due to receiving heat from the combustion field in premixed combustion), diffusion combustion starts in the cylinder, the combustion field equivalence ratio moves to the rich side, and the combustion field gas temperature rises due to the combustion of the fuel. In this diffusion combustion as well, the combustion field environment does not reach a smoke production region or a NOx production reduction.

Although the equivalence ratio rises in the latter half of diffusion combustion, the combustion field environment is the Y region (CO region) as shown in FIG. 6, and the production of NOx and smoke is suppressed.

(High-Load Operation)

Next is a description of combustion forms during high-load operation of the engine 1.

During high-load operation of the engine 1 in which the total fuel injection amount has been set high, if three divided main injections are performed similarly to the above-described case of low-load operation, due to the fact that a long total fuel injection period is required, the fuel injected in the combustion chamber 3 in each injection period undergoes combustion, and the combustion progresses in the intervals (periods when fuel injection is stopped). For this reason, the temperature in the combustion chamber 3 rises rapidly, and it is possible to lose the ability to sufficiently perform premixed combustion.

In view of this, in the present embodiment, during high-load operation, the total main injection amount required in main injection (the total fuel injection amount for obtaining the required torque) is ensured by executing two divided main injections, and the initial combustion fuel injection period for performing initial slow-burning combustion (injection period in slow-burning combustion main injection) and the premixed combustion fuel injection period for performing premixed combustion (injection period in premixed combustion main injection) are set so as to be continuous injection periods. Specifically, fuel injection in the initial combustion fuel injection period for performing initial slow-burning combustion and fuel injection in the premixed combustion fuel injection period for performing premixed combustion are made continuous without stopping fuel injection (fuel injection control operation performed by spray cooling control means). This is specifically described below.

As shown in FIG. 5, the divided main injections during high-load operation of the engine 1 are an initial continuous main injection in which slow-burning combustion main injection and premixed combustion main injection are performed in a continuous manner, and diffusion combustion main injection. In initial continuous main injection, the injection start time is set to before compression top dead center (BTDC) of the piston 13, and the injection end time is set to after compression top dead center (ATDC) of the piston 13. For example, injection is started at 15° before compression top dead center (15° BTDC), and injection ends at 20° after compression top dead center (20° ATDC). There is no limitation to these values. Accordingly, in diffusion combustion main injection, injection is performed on the angle of delay side of compression top dead center (TDC) of the piston 13.

Also, as described above, the fuel injection amount in initial continuous main injection is set higher than the fuel injection amount in diffusion combustion main injection. In the case where the total fuel injection amount during high-load operation is 40 mm$^3$, the total fuel injection amount in initial continuous main injection is set to 35 mm$^3$, and the fuel injection amount in diffusion combustion main injection is set to 5 mm$^3$. There is no limitation to these values.

A predetermined interval is provided between the initial continuous main injection and the diffusion combustion main injection. Specifically, fuel injection is paused (the injector 23 is cut off) after initial continuous main injection has been executed, and then diffusion combustion main injection is started after a predetermined interval has elapsed. This interval is set as, for example, the minimum valve closing period (the minimum period from the closing to the opening of the valve of the injector 23 (e.g., 200 μs), which is determined by the performance of the injector 23). This divided main injection interval is not limited to the above value, and as will be described later, can be appropriately set such that functions are exhibited in the various combustion forms. For example, the injection period of initial continuous main injection is adjusted to a period in the crank angle range of 20° to 45°.

<Initial Continuous Main Injection>

As shown in FIG. 5, in initial continuous main injection performed during high-load operation, injection is started on the angle of advance side of compression top dead center (TDC) of the piston 13 (e.g., 15° BTDC), and injection is ended on the angle of delay side of compression top dead center of the piston 13 (e.g., 20° BTDC). In other words, fuel injection is continued at a low fuel injection rate (a low fuel injection rate due to the reduced diameter of the injection holes of the injector 23) over a relatively long period.

Accordingly, in the majority of the injection period of initial continuous main injection, excluding the start time and the end time, fuel injected in the combustion chamber 3 is cooled by an endothermic reaction with the fuel that is subsequently injected in the combustion chamber 3. This cooling effect of subsequently injected fuel (autointerference cooling effect) is performed in a continuous manner, thus suppressing a rise in the combustion field temperature (temperature in the region where the fuel spray is present) in the combustion chamber 3.

As a specific description of the state of the cooling effect in the execution period of initial continuous main injection, first, no previously-injected fuel is present in the case of the fuel injected in the combustion chamber 3 at the start of injection in initial continuous main injection, and therefore the autointerference cooling effect of fuel due to an endothermic reaction with injected fuel does not occur at the start of fuel injection. As described above, the fuel injected thereafter in a continuous manner cools the fuel that was previously injected in the combustion chamber 3 due to an endothermic reaction being carried out in the combustion chamber 3. This state continues while the fuel injection rate in initial continuous main injection is substantially constant (until the fuel injection rate starts to decrease due to forward movement (movement in the valve closing direction) of the needle that accompanies an operation for stopping initial continuous main injection) (see the hatched period in FIG. 5). Then, when the forward movement (movement in the valve closing period) of the needle that accompanies an operation for stopping initial continuous main injection starts, the penetration force of subsequently injected fuel decreases, and the flight distance also decreases. Accordingly, the injected fuel does not reach the spray region of the fuel that was previously injected in the combustion chamber 3, and the autointerference cooling effect no longer occurs. For this reason, as described above, the autointerference cooling effect occurs in the majority of the injection period of initial continuous main injection, excluding the start time and the end time.

Figure 9:
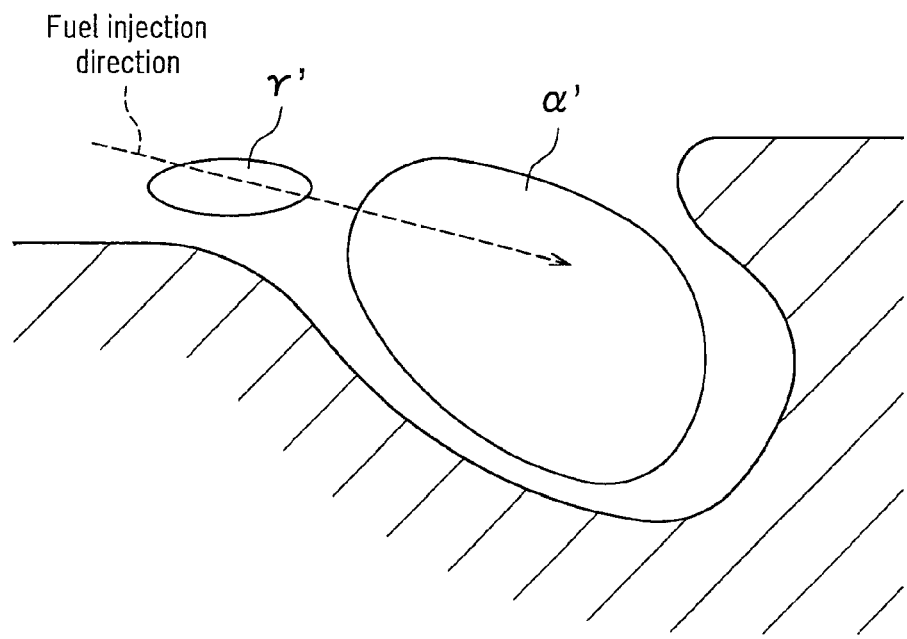
FIG. 9 is a cross-sectional diagram of the top portion of a piston showing combustion fields in a combustion chamber in various types of combustion during high-load operation of an engine.

Also, since the total fuel injection amount is relatively high in initial continuous main injection, the penetration force of the fuel is relatively high and reaches a relatively large range of space in the combustion chamber 3 (the outer circumferential space in the cavity 13b, which is the region indicated by α' in FIG. 9). Note that as described above, the effect of reducing the combustion temperature using exhaust gas recirculated by the EGR apparatus is sufficiently exhibited in this portion. In this way, since fuel injected in initial continuous main injection is cooled by an autointerference cooling effect, ignition delay is promoted, and a rise in the temperature in the combustion chamber 3 is suppressed.

As a result, the majority of the combustion form of fuel injected in initial continuous main injection is premixed combustion, and oxygen is not insufficient in the combustion field, thus enabling suppressing the production of smoke. Also, suppressing the production of smoke in this way enables setting an even higher EGR rate, or in other words, a state in which smoke is not produced even if the EGR rate is set high can be obtained, thus enabling also significantly reducing the amount of NOx that is produced along with this high-volume EGR.

Also, in the injection period of initial continuous main injection as well, similarly to the above-described case of low-load operation, an encounter rate reduction operation is performed in order to reduce the encounter rate between oxygen and the fuel spray in the cylinder. Specifically, at least any one of an exhaust gas recirculation operation performed by the EGR apparatus, an intake throttle valve operation in the intake system, and an operation for reducing the in-cylinder temperature is executed as the encounter rate reduction operation. These encounter rate reduction operations have been described above, and therefore will not be described here.

Note that the encounter rate reduction operation is not limited to the examples described above, and another example is an operation for delaying the injection period of fuel injected from the injector 23. In this case, the waveforms show in FIG. 5 move to the angle of delay side, and the initial continuous main injection period and the diffusion combustion fuel injection period also move to the angle of delay side. Moving the fuel injection timing to the angle of delay side in this way enables reducing the combustion temperature in the combustion chamber 3.

In this way, since initial continuous main injection is executed while the encounter rate reduction operation is being performed, a temperature rise in the combustion chamber 3 is suppressed by a synergistic effect with the autointerference cooling effect, and it is possible to suppress the production of smoke and reduce the amount of NOx that is produced through high-volume EGR. It is also possible to reduce combustion noise.

Note that the injection amount (corresponding to the valve opening period of the injector 23) and injection period in initial continuous main injection is set through experimentation or simulation, for example.

<Diffusion Combustion Main Injection>

Fuel injection in diffusion combustion main injection during high-load operation of the engine 1 is started after premixed combustion of the fuel injected in initial continuous main injection, at a time after the in-cylinder temperature has reached the temperature at which diffusion combustion can occur (900 K). For example, injection is performed at 22° ATDC. The fuel injected in diffusion combustion main injection then undergoes diffusion combustion in which combustion gradually progresses immediately after injection.

The fuel injection amount in diffusion combustion main injection is set to 5 mm$^3$, for example, as described above. There is no limitation to this value. Note that the fuel injection amount in diffusion combustion main injection is set such that, for example, combustion noise in the diffusion combustion is less than or equal to a pre-set allowable combustion noise. Specifically, the amount of fuel injected in the combustion chamber 3 in initial continuous main injection is the remaining fuel amount obtained by subtracting the fuel injection amount in diffusion combustion main injection that has been set as described above from the total fuel injection amount during high-load operation (40 mm$^3$ in the case of the present embodiment).

The fuel injected in diffusion combustion main injection has a lower penetration force than the fuel injected in initial continuous main injection, and therefore does not reach the combustion field of the fuel injected in initial continuous main injection (the region indicated by α' in FIG. 9), and diffusion combustion is performed in, for example, a relatively small region indicated by region γ' in FIG. 9 (inner circumferential space in the cavity 13b).

Note that the above description takes the example of the case where the combustion field in initial continuous main injection is region α' in FIG. 9, and the combustion field in diffusion combustion is region γ' in FIG. 9, that is to say, the case where the regions are separate from each other, but there are cases where portions of these regions overlap each other.

Also, since combustion in the diffusion combustion main injection is diffusion combustion, similarly to the above-described case of low-load operation, controlling the fuel injection timing thereof enables controlling the heat generation rate waveform that accompanies this combustion.

As described above, the fuel injection amount in diffusion combustion main injection for performing diffusion combustion is set significantly lower than the fuel injection amount in initial continuous main injection. In other words, the majority of the total fuel injection amount that is set relatively high during high-load operation (e.g., 40 mm$^3$) is the fuel injection amount in initial continuous main injection, and the fuel injection amount in diffusion combustion main injection is set significantly low. This ensure a large proportion for the combustion of fuel injected in initial continuous main injection (the majority of which is premixed combustion), and a significantly low proportion is set for the combustion of fuel injected in diffusion combustion main injection (diffusion combustion). Setting a low fuel injection amount in diffusion combustion in this way also enables suppressing the production of smoke and reducing the amount of NOx produced.

Note that injection amount in diffusion combustion main injection is also set through experimentation or simulation, for example.

The following describes changes in the combustion field environment in the execution of main injection during high-load operation as described above, with reference to FIG. 7. As described above, FIG. 7 is a map showing change in combustion field gas temperatures and combustion field equivalence ratios.

As shown in FIG. 7, when initial continuous main injection starts (point A' in FIG. 7), the combustion field equivalence ratio rises since the fuel injection amount is relatively high. Although initial slow-burning combustion and premixed combustion are performed in the combustion field at this time, the rise in the combustion field gas temperature is slight since the autointerference cooling effect is achieved in the combustion field as described above. Accordingly, the combustion field environment does not reach a smoke production region or a NOx production reduction.

Thereafter, when diffusion combustion main injection is started (point C' in FIG. 7, which is when diffusion combustion starts upon the gas temperature rising to point C'), diffusion combustion starts in the cylinder, the combustion field equivalence ratio moves to the rich side, and the combustion field gas temperature rises due to the combustion of the fuel. In this diffusion combustion as well, the combustion field environment does not reach a smoke production region or a NOx production reduction.

In the latter half of diffusion combustion, the combustion field environment is the Y region (CO region) as shown in FIG. 7, and the production of NOx and smoke is suppressed.

—Fuel Injection Form Change Control—

Figure 10:
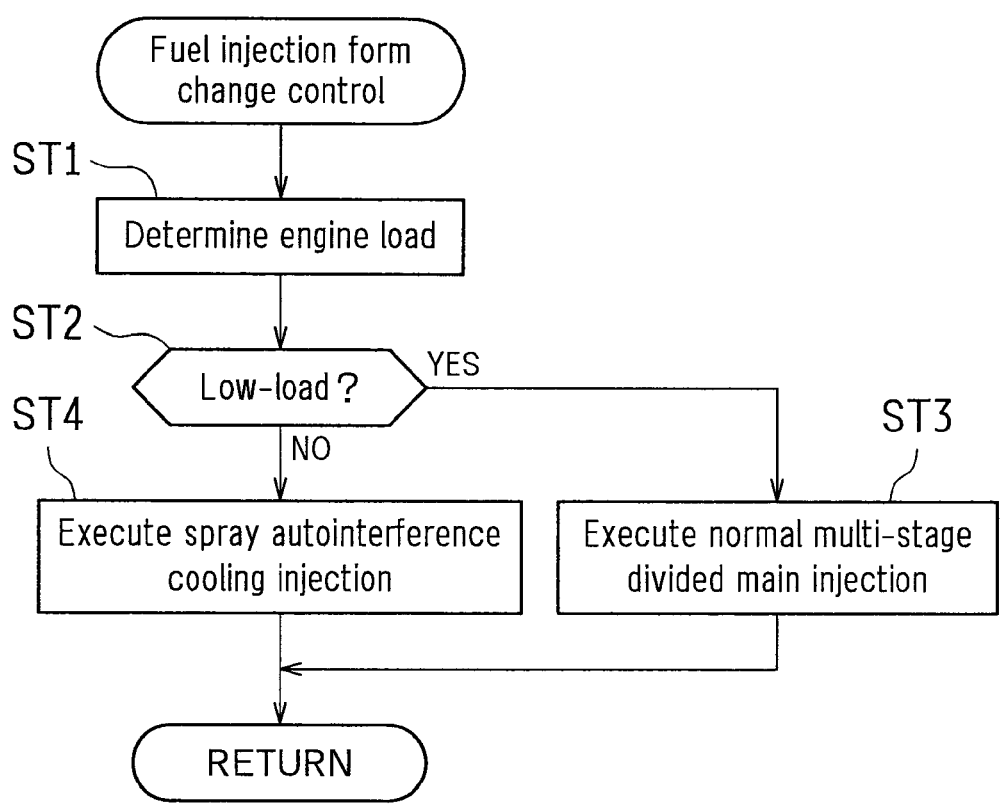
FIG. 10 is a flowchart showing a procedure of fuel injection form change control.
Figure 11:
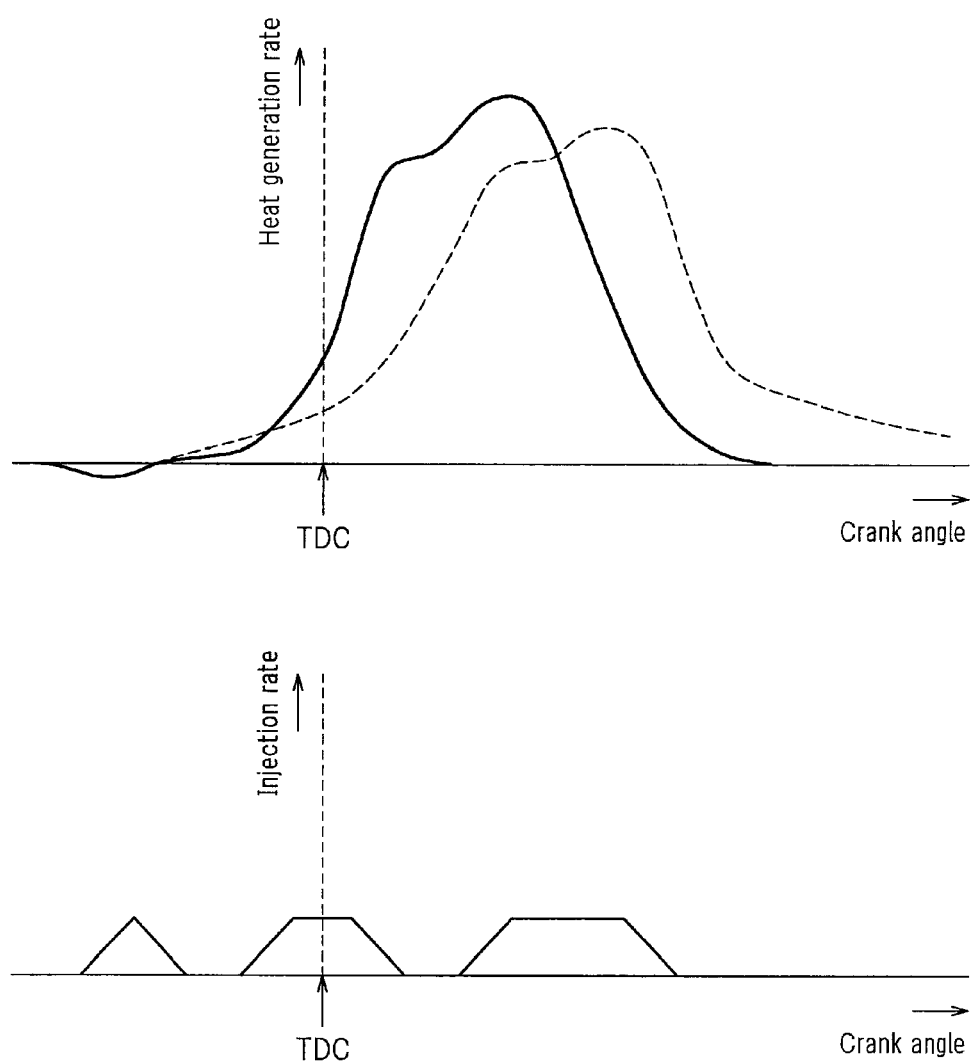
FIG. 11 shows change in the heat generation rate in a cylinder and a fuel injection pattern in a main injection execution period in the case where three divided injections are performed, according to a conventional example.

Next is a description of a control operation for changing the fuel injection form according to the load state of the engine 1 as described above, with reference to the flowchart of FIG. 10. The routine shown in FIG. 10 is executed at a predetermined interval after engine starting, such as every several msec.

First, in step ST1, an engine load determination operation is performed. For example, the engine load is determined by storing, in the ROM 102, a load determination map or arithmetic expression whose parameters are, for example, the engine rotational speed calculated based on the detection value from the crank position sensor 40 and the accelerator pedal depression amount obtained from the detection signal from the accelerator opening degree sensor 47.

Thereafter, the routine moves to step ST2 in which a determination is made as to whether the engine load is the low-load state. If the engine load is the low-load state, and "YES" has been determined in step ST2, the routine moves to step ST3 in which normal multi-stage divided main injection is executed. Specifically, three divided main injections are executed as shown in FIG. 4. Specifically, slow-burning combustion main injection is executed, then fuel injection is paused, and premixed combustion main injection is started after a predetermined interval has elapsed. Also, fuel injection is paused after premixed combustion main injection has been executed, and then diffusion combustion main injection is started after the predetermined interval has elapsed, thus executing multi-stage divided main injection.

On the other hand, in the case where the engine load is a mid-load state or a high-load state, and "NO" has been determined in step ST2, the routine moves to step ST4 in which divided main injection for performing the above-described autointerference cooling effect (spray autointerference cooling injection) is executed. Specifically, two divided main injections, namely initial continuous main injection and diffusion combustion main injection, are executed as shown in FIG. 5. Specifically, initial continuous main injection in which slow-burning combustion main injection and premixed combustion main injection are performed in a continuous manner is executed, then fuel injection is paused, and diffusion combustion main injection is started after a predetermined interval has elapsed, thus executing divided main injection.

In this way, the fuel injection form is changed according to the load state.

As described above, according to the present embodiment, the majority of the total fuel injection amount that is set relatively high during high-load operation of the engine 1 is the fuel injection amount in initial continuous main injection, and the fuel injection amount in diffusion combustion main injection is set significantly low. Also, ignition delay is promoted in the combustion chamber 3 by the autointerference cooling effect of fuel injected in initial continuous main injection, and this suppresses a temperature rise in the combustion chamber 3. This ensure a large proportion for premixed combustion in the combustion of fuel injected in initial continuous main injection, and a significantly low proportion is set for diffusion combustion in the combustion of fuel injected in diffusion combustion main injection. This enables suppressing the production of smoke even when performing high-volume EGR, thus making it possible to achieve both the suppression of the amount of NOx produced and the suppression of the amount of smoke produced. Also, since the amount of NOx produced can be suppressed without delaying the fuel injection timing, combustion efficiency can be improved by setting the fuel injection timing on the angle of advance side.

Also, in the present embodiment, since the amount of NOx produced can be significantly reduced, it is possible to reduce the amount of the NSR catalyst 75 and the DPNR catalyst 76, and since the NOx production amount can be set to substantially "0", it is possible to achieve a configuration in which the NSR catalyst 75 and the DPNR catalyst 76 are omitted, and only a three-way catalyst is provided in the exhaust system 6 in their place. This makes it possible for an exhaust system having a relatively simple structure similar to that of a gasoline engine to be realized in a diesel engine.

Other Embodiments

In the above-described embodiment, a description is given taking the example where the present invention is applied to an in-line four-cylinder diesel engine mounted in an automobile. The present invention is not limited to use in an automobile, and is applicable also to engines used in other applications. Also, there is no particular limitation with respect to the number of cylinders or the engine type (classified as an in-line engine, V-type engine, horizontal opposed engine, and so forth).

Also, in the embodiment described above, the maniverter 77 is provided with the NSR catalyst 75 and the DPNR catalyst 76, but a maniverter provided with the NSR catalyst 75 and a DPF (Diesel Paticulate Filter) may be used as well.

Note that in the embodiment described above, the EGR apparatus has a configuration in which exhaust gas in the exhaust manifold 72 is recirculated to the intake system 6. The present invention is not limited to this, and it is possible to employ an LPL (Low Pressure Loop) EGR apparatus that recirculates exhaust gas on the downstream side of the turbine wheel 52 in the turbocharger 5 to the intake system 6.

Note that in the above embodiment, the start time of initial slow-burning combustion performed during low-load operation is set to BTDC (on the angle of advance side of compression top dead center of the piston 13). The present invention is not limited to this, and the start time of initial slow-burning combustion may be set to TDC (compression top dead center of piston 13), and depending on the case, the start time of initial slow-burning combustion may be set to ATDC (on the angle of delay side of compression top dead center of the piston 13).

Also, the above embodiment describes the case where a piezo injector 23 in which the fuel injection rate is changed by achieving full valve opening only when power is being conducted is applied to the engine 1. The present invention is not limited to this, and is also applicable to an engine including a variable injection rate injector whose injection rate can be changed according the power conduction voltage value or the like.

Also, the above embodiment describes the case where an injector 23 having a very small injection hole diameter is applied to the engine 1. The present invention is not limited to this, and is also applicable to an engine including an injector having a normal injection hole diameter.

Furthermore, the above embodiment describes the engine 1 having a low fuel injection rate due to a reduction in the injection hole diameter of the injector 23. The present invention is not limited to this, and is also applicable to an engine having a low fuel injection rate due to setting a low fuel injection pressure (common rail internal pressure).

Also, in the above embodiment, diffusion combustion main injection is performed using one fuel injection. The present invention is not limited to this, and diffusion combustion main injection may be performed using multiple fuel injections.

Additionally, although the injector 23 in the above embodiment has ten injection holes, this number of injection holes can be set arbitrarily. Note that the number of injection holes needs to be set such that it is possible to ensure the required fuel injection amount in the predetermined fuel injection period. In particular, with an injector having a very small injection hole diameter, the number of injection holes needs to be set to a high number (e.g., ten or more).

INDUSTRIAL APPLICABILITY

The present invention is applicable to fuel injection control in a common rail in-cylinder direct injection multi-cylinder diesel engine mounted in an automobile.

REFERENCE SIGNS LIST 1 engine (internal combustion engine)
13 piston
3 combustion chamber
23 injector (fuel injection valve)
6 intake system
62 throttle valve (intake throttle valve)
7 exhaust system
8 EGR path
81 EGR valve
82 EGR cooler

The invention claimed is:

1. A combustion control apparatus of a compression self-ignition internal combustion engine including an exhaust gas recirculation apparatus by which part of exhaust gas discharged to an exhaust system is recirculated into an intake system, and a fuel injection valve configured such that multi-stage divided main injections can be executed as main injection that is fuel injection for obtaining required torque that is determined according to the internal combustion engine operating state,
    wherein at a time of low-load operation of the internal combustion engine, fuel injections respectively corresponding to initial slow-burning combustion, premixed combustion, and diffusion combustion are executed in order as mutually independent multi stage divided main injections, and
    at a time of high-load operation of the internal combustion engine, in a state in which part of exhaust gas is recirculated into the intake system by the exhaust gas recirculation apparatus,
    continuous main injection that is continuous for a period from before compression top dead center of a piston to after compression top dead center is executed, premixed combustion is performed by achieving a spray cooling effect in a combustion chamber through an endothermic reaction of fuel injected by the continuous main injection, wherein the endothermic reaction occurs as a result of movement of the fuel injection valve while a fuel injection rate is substantially constant,
    diffusion combustion main injection that performs diffusion combustion, wherein the diffusion combustion main injection is executed after the continuous main injection has ended, and a fuel injection amount in the continuous main injection is set higher than a fuel injection amount in the diffusion combustion main injection.

2. The combustion control apparatus of an internal combustion engine according to claim 1,
    being configured such that an encounter rate reduction operation for reducing an encounter rate between oxygen and fuel spray in a cylinder is performed while the continuous main injection is executed.

3. The combustion control apparatus of an internal combustion engine according to claim 2,
    wherein at least any one of an exhaust gas recirculation operation performed by the exhaust gas recirculation apparatus, an intake throttle valve operation in the intake system, and an operation for reducing the in-cylinder temperature is executed as the encounter rate reduction operation.

4. The combustion control apparatus of an internal combustion engine according to claim 1,
    wherein fuel injection control is executed such that a time at which a heat generation rate changes from rising to falling in a combustion period spanning from the premixed combustion obtained by execution of the continuous main injection through the diffusion combustion obtained by subsequent execution of the diffusion combustion main injection is present at only one place on the angle of delay side of compression top dead center of a piston.

5. The combustion control apparatus of an internal combustion engine according to claim 1, wherein an exhaust gas recirculation rate in a state in which part of exhaust gas is recirculated into the intake system by the exhaust gas recirculation apparatus is set to 20% or more.

6. The combustion control apparatus of an internal combustion engine according to claim 1,
wherein the injection hole diameter of the fuel injection valve has been reduced such that a fuel injection rate at a time of valve opening is less than or equal to a predetermined injection rate.

7. The combustion control apparatus of an internal combustion engine according to claim 1,
wherein a penetration force of fuel in the diffusion combustion main injection is set to be lower than a penetration force of fuel in the continuous main injection.

* * * * *